US012366818B2

(12) United States Patent
Tsuzaki et al.

(10) Patent No.: US 12,366,818 B2
(45) Date of Patent: Jul. 22, 2025

(54) IMAGE FORMING APPARATUS TO SUPPRESS GLOSS UNEVENNESS

(71) Applicant: CANON KABUSHIKI KAISHA, Tokyo (JP)

(72) Inventors: Shohei Tsuzaki, Chiba (JP); Asuna Fukamachi, Chiba (JP); Yusuke Yamaguchi, Chiba (JP); Hiroshi Miyamoto, Saitama (JP); Yasuharu Toratani, Chiba (JP); Keisuke Yoshida, Chiba (JP); Shutaro Saito, Tokyo (JP); Yuya Yamada, Chiba (JP); Taku Ashida, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/486,069

(22) Filed: Oct. 12, 2023

(65) Prior Publication Data

US 2024/0126197 A1 Apr. 18, 2024

(30) Foreign Application Priority Data

Oct. 17, 2022 (JP) ................................ 2022-166038

(51) Int. Cl.
*G03G 15/00* (2006.01)
*G03G 15/20* (2006.01)

(52) U.S. Cl.
CPC ..... *G03G 15/2064* (2013.01); *G03G 15/2025* (2013.01); *G03G 15/607* (2013.01);
(Continued)

(58) Field of Classification Search
CPC .......... G03G 15/2017; G03G 15/2025; G03G 15/2028; G03G 15/607; G03G 15/657; G03G 15/6585; G03G 2215/00805
See application file for complete search history.

(56) References Cited

U.S. PATENT DOCUMENTS

| | | | | |
|---|---|---|---|---|
| 2007/0217841 A1* | 9/2007 | Fujii | G03G 15/2064 | 399/341 |
| 2011/0091249 A1* | 4/2011 | Murakami | G03G 15/2028 | 399/323 |
| 2012/0051804 A1* | 3/2012 | Takeshita | G03G 15/2028 | 399/323 |

FOREIGN PATENT DOCUMENTS

| | | |
|---|---|---|
| JP | 2007187791 A | 7/2007 |
| JP | 2013061634 A | 4/2013 |

(Continued)

*Primary Examiner* — Sophia S Chen
(74) *Attorney, Agent, or Firm* — CANON U.S.A, INC. IP DIVISION

(57) ABSTRACT

An image forming apparatus includes a reception unit to receive a job, heating and pressing rotary members to form a nip portion, and a spraying member having a nozzle and a cylinder. The nozzle discharges air to the heating rotary member and a recording material. During a period after the reception unit receives the job and before a leading edge of a first sheet of the recording material reaches the nip portion, the spraying member performs a spraying operation of spraying air in an amount greater than or equal to a predetermined amount. The air that the spraying member sprays on the first sheet of the recording material during the job is higher in temperature than the air that the spraying member sprays during the period after the reception unit receives the job and before the leading edge of the first sheet of the recording material reaches the nip portion.

12 Claims, 23 Drawing Sheets

(52) U.S. Cl.
CPC .................. *G03G 15/6585* (2013.01); *G03G 2215/00805* (2013.01)

(56) References Cited

FOREIGN PATENT DOCUMENTS

| | | | |
|---|---|---|---|
| JP | 2015156005 | A | 8/2015 |
| JP | 2016188913 | A | 11/2016 |

* cited by examiner

| RANK | LEVEL |
|---|---|
| 5 | NO UNEVENNESS |
| 4 | VISUALLY UNIDENTIFIABLE |
| 3 | VAGUELY VISIBLE |
| 2 | VISIBLE |
| 1 | CLEARLY VISIBLE |

IMAGE FORMING APPARATUS TO SUPPRESS GLOSS UNEVENNESS

BACKGROUND

Field

The present disclosure relates to an image forming apparatus that forms a toner image on a recording material.

Description of the Related Art

Many electrophotographic image forming apparatuses generally use a fixing device including a heating rotary member and a pressing member. The heating rotary member and the pressing member apply heat and pressure to a recording material bearing a toner image while conveying the recording material to fix the toner image to the recording material. In a fixing device using the foregoing method, an unfixed toner image formed on a recording material is brought into direct contact with a surface of the heating rotary member. The direct contact between the heating rotary member and the toner image melts the toner, and this makes it difficult to separate the recording material from the heating rotary member and sometimes causes a jam.

To address the issue, Japanese Patent Application Laid-Open No. 2013-61634 discusses a technique of separating a recording material from a heating rotary member by spraying air to a leading edge of the recording material.

With the configuration that separates a recording material from a heating rotary member by spraying air to a leading edge of the recording material, the air hits some regions of the recording material but does not hit other regions of the recording material in a width direction of the heating rotary member. The regions hit by the air are cooled by the air, so that the toner image on the recording material is cooled and fixed in these regions. As a result, glossiness of the toner image tends to be maintained in the regions hit by the air. On the contrary, the toner image is not cooled easily in the regions not hit by the air. Thus, in the regions not hit by the air, the toner image is slightly deformed by heat applied at a nip portion. This causes a difference in glossiness between the regions hit by the air and the regions not hit by the air, and gloss unevenness in the toner image may occur.

SUMMARY

The present disclosure is directed to suppressing gloss unevenness in a toner image formed on a recording material.

According to an aspect of the present disclosure, an image forming apparatus includes a reception unit configured to receive a job for image formation on a recording material, a heating rotary member configured to rotate and to heat the recording material, a pressing rotary member configured to come into contact with the heating rotary member to form a nip portion, wherein, at the nip portion, the pressing rotary member together with the heating rotary member fixes a toner image to the recording material, and a spraying member configured to spray air on the recording material and the heating rotary member and including a nozzle and a cylinder configured to send air to the nozzle, wherein the nozzle is configured to discharge air to the heating rotary member and the recording material, and is located downstream of the nip portion in a conveyance direction of the recording material, wherein, during a period after the reception unit receives the job and before a leading edge of a first sheet of the recording material reaches the nip portion, the spraying member performs a spraying operation of spraying the air in an amount greater than or equal to a predetermined amount, and wherein the air that the spraying member sprays on the first sheet of the recording material during the job is higher in temperature than the air that the spraying member sprays during the period after the reception unit receives the job and before the leading edge of the first sheet of the recording material reaches the nip portion.

DESCRIPTION OF THE EMBODIMENTS

<Image Forming Apparatus>

A configuration of an image forming apparatus according to a first exemplary embodiment of the present disclosure will be schematically described with reference to FIG. 1.

Figure 1:
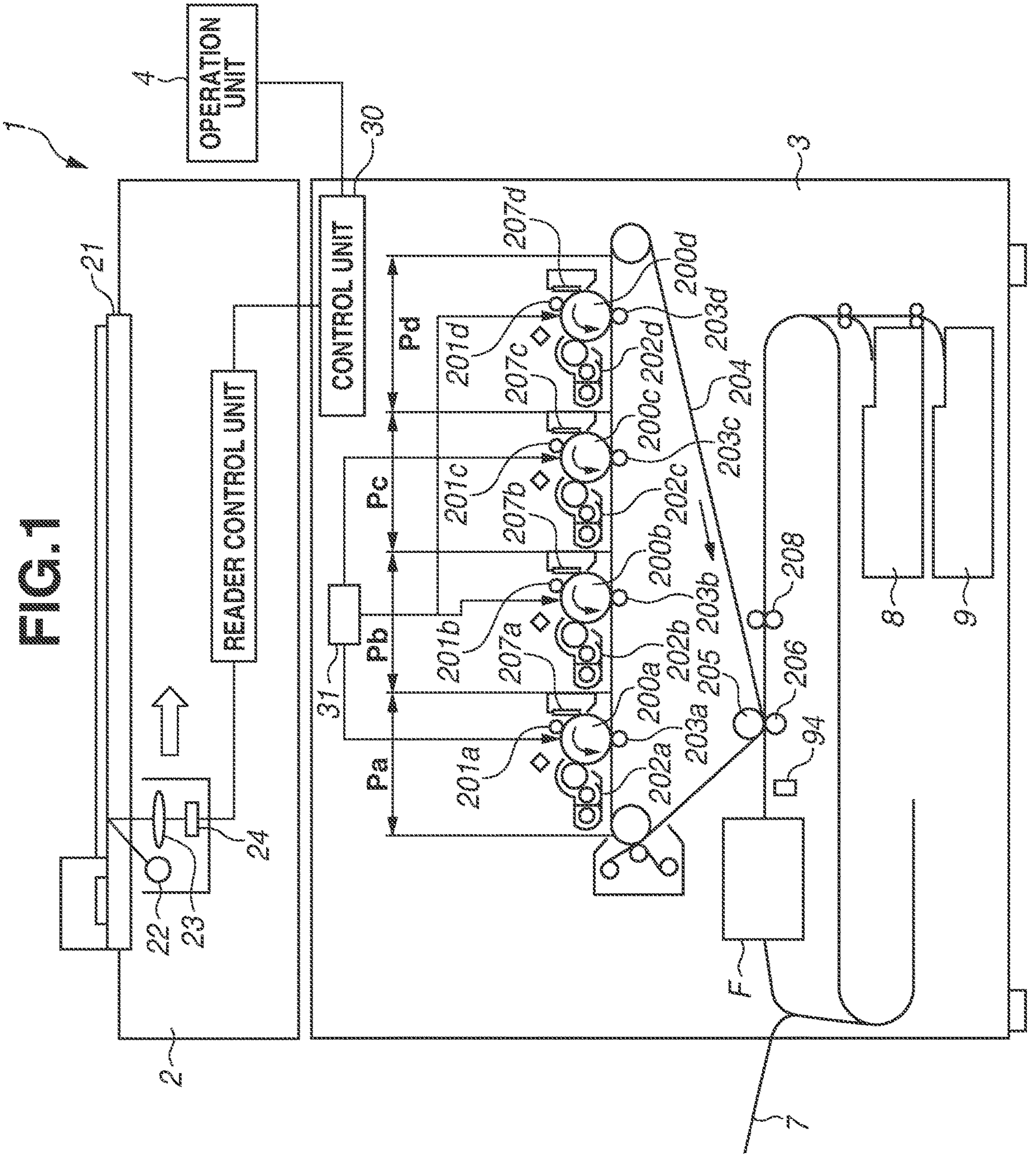
FIG. 1 is a schematic view illustrating an image forming apparatus.

FIG. 1 illustrates a full-color image forming apparatus (hereinafter referred to as an image forming apparatus) 1 according to the present exemplary embodiment. The image forming apparatus 1 includes an image reader unit 2 and an image forming apparatus body 3. The image reader unit 2 reads a document placed on a platen glass 21. Light emitted from a light source 22 is reflected by the document, travels through an optical system member 23, such as a lens, and forms an image on a charge-coupled device (CCD) sensor 24. Such an optical system unit scans the document in a direction indicated by an arrow and converts the document into an electric signal data string on a line-by-line basis. Image signals obtained by the CCD sensor 24 are transmitted to the image forming apparatus body 3, and a control unit 30 performs image processing suitable for each image forming unit (described below) on the image signals. The control unit 30 also receives, as image signals, inputs from an external host apparatus, such as a print server.

The image forming apparatus body 3 includes a plurality of image forming units Pa, Pb, Pc, and Pd, and the image forming units Pa, Pb, Pc, and Pd form images based on the image signals described above. More specifically, the image signals are converted into pulse-width modulated (PWM) laser beams by the control unit 30. In FIG. 1, a polygon scanner 31 serving as an exposure device scans the laser beams corresponding to the image signals. Then, photosensitive drums 200*a* to 200*d*, which are image bearing members of the image forming units Pa to Pd, are irradiated with the laser beams.

The image forming units Pa, Pb, Pc, and Pd are image forming units for yellow (Y), magenta (M), cyan (C), and black (Bk), respectively. The image forming units Pa to Pd form images of the respective colors. Since the image forming units Pa to Pd are substantially the same, the image forming unit Pa for yellow (Y) will be described in detail below, and redundant descriptions of the other image forming units Pb to Pd will be omitted. A toner image is formed on a surface of the photosensitive drum 200*a* of the image forming unit Pa based on an image signal as described below.

A primary charging device 201*a* charges the surface of the photosensitive drum 200*a* to predetermined potential to prepare for forming an electrostatic latent image. The polygon scanner 31 emits the laser beam to form an electrostatic latent image on the surface of the photosensitive drum 200*a* charged to the predetermined potential. A development device 202*a* develops the electrostatic latent image on the photosensitive drum 200*a* to form a toner image. A transfer roller 203*a* performs discharge from a back surface of an intermediate transfer belt 204, applies a primary transfer bias with polarity opposite to the polarity of the toner, and transfers the toner image on the photosensitive drum 200*a* onto the intermediate transfer belt 204. After the transfer, the surface of the photosensitive drum 200*a* is cleaned by a cleaner 207*a*. As described above, the other image forming units Pb to Pd have primary charging devices 201*b*-201*d*, development devices 202*b*-202*d*, transfer rollers 203*b*-203*d*, and cleaners 207*b*-207*d* that are substantially the same as those described for the image forming unit Pa, so redundant descriptions will be omitted.

The toner image on the intermediate transfer belt 204 is conveyed to the next image forming unit Pb. Toner images of Y, M, C, and Bk formed by the image forming units Pa, Pb, Pc, and Pd are sequentially transferred in this order onto the intermediate transfer belt 204, so that a four-color toner image is formed on the surface of the intermediate transfer belt 204. The toner image having passed through the image forming unit Pd for Bk is secondarily transferred onto a recording material P at a secondary transfer portion formed by a pair of secondary transfer rollers 205 and 206 by application of a secondary transfer electric field with opposite polarity to the polarity of the toner image on the intermediate transfer belt 204. The recording material P fed from a recording material cassette 8 or a recording material cassette 9 stands by at a registration portion 208 and is then conveyed from the registration portion 208 at timing controlled to align the toner image on the intermediate transfer belt 204 and the recording material P. The toner image on the recording material P is then fixed to the recording material P by a fixing device F serving as an image heating device. The recording material P having passed through the fixing device F is discharged outside the image forming apparatus 1. In the case of a duplex print job, after the transfer and fixing of the toner to a first image forming surface (a first side) are ended, the recording material P is conveyed to a reversing portion provided on a downstream side of the fixing device F in the image forming apparatus 1. The recording material P is turned upside down by the reversing portion, so that the transfer and fixing of toner to a second image forming surface (a second side) are performed. The recording material P is then discharged outside the image forming apparatus 1 and is stacked on a sheet discharge tray 7.

Next, a configuration of the fixing device F according to the present exemplary embodiment will be described with reference to FIG. 2.

<Fixing Device>

Figure 2:
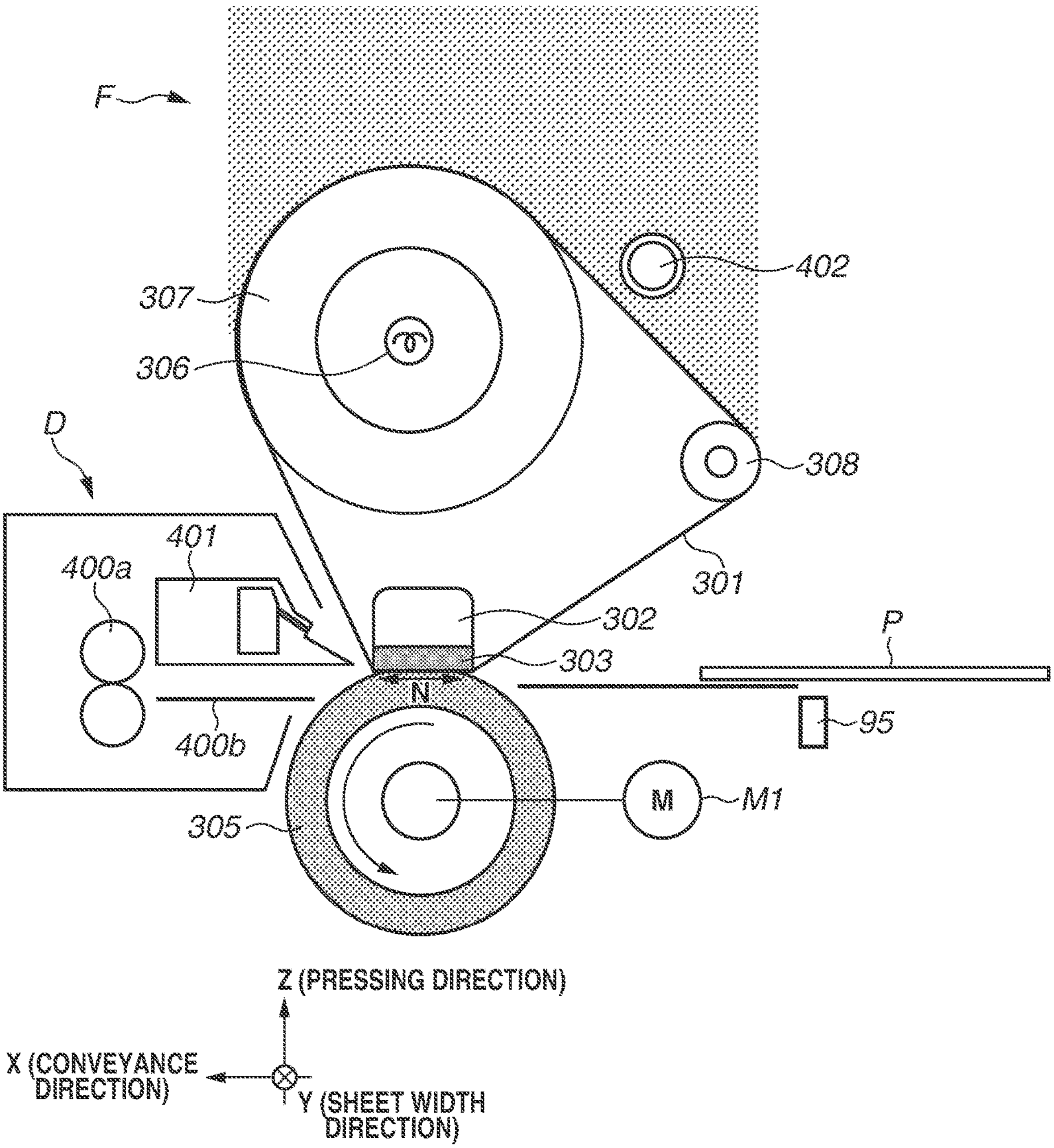
FIG. 2 is a cross-sectional view illustrating a fixing device according to a first exemplary embodiment.

FIG. 2 is a schematic cross-sectional view illustrating an entire configuration of the fixing device F using a belt heating method according to the present exemplary embodiment. In FIG. 2, an X-direction is a conveyance direction of the recording material P, a Y-direction is a belt width direction (a sheet width direction), and a Z-direction is a pressing direction. The pressing direction refers to a direction in which a pressing roller 305 serving as a pressing rotary member (described below) presses a fixing belt 301 serving as a heating rotary member.

The fixing device F includes the heating rotary member and the pressing rotary member. The heating rotary member is endless and rotatable. The fixing device F according to the present exemplary embodiment includes a pressing pad (hereinafter referred to as a pad) 303, a heating roller 307, and a steering roller 308. The pad 303, the heating roller 307, and the steering roller 308 are in contact with an inner periphery of the fixing belt (hereinafter referred to as the belt) 301 serving as the heating rotary member. The fixing device F further includes a stay 302 for supporting the pad 303.

The fixing device F according to the present exemplary embodiment includes the pressing roller 305 serving as the pressing rotary member. The pressing roller 305 faces the belt 301, and the pressing roller 305 and the pad 303 hold the belt 301 therebetween and form a fixing nip portion (hereinafter referred to as a nip portion) N.

The belt 301 exhibits heat conductivity and thermal resistance, and has a thin-film cylindrical shape. The belt 301 according to the present exemplary embodiment has a three-layer structure including a base layer, an elastic layer formed on an outer periphery of the base layer, and a releasable layer formed on an outer periphery of the elastic layer. The base layer has a thickness of 80 μm and is made of polyimide resin (PI).

The elastic layer has a thickness of 300 μm and is made of silicone rubber. The releasable layer has a thickness of 30 μm and is made of tetrafluoroethylene/perfluoroalkoxyethylene copolymer resin (PFA) as fluororesin. The belt 301 is stretched by the pad 303, the heating roller 307, and the steering roller 308.

The pad 303 is pressed against the pressing roller 305 via the stay 302 with the belt 301 between the pad 303 and the pressing roller 305. The pad 303 is made of liquid crystal polymer (LCP) resin. The stay 302 is made of metal, such as stainless steel, to have sufficient strength to press the pad 303 uniformly against the pressing roller 305. A sliding member is disposed between the pad 303 and the belt 301. A lubricant is applied to the inner surface of the belt 301 to enable the belt 301 to slide smoothly along the sliding member. Silicone oil is used as the lubricant.

The heating roller 307 is a stainless-steel pipe having a thickness of 1 mm, and a halogen heater 306 serving as a heat source is disposed in the heating roller 307 and can generate heat up to a predetermined temperature. The belt 301 is heated by the heating roller 307. The heating roller 307 is connected to a drive source so as to be driven to rotate.

The pressing roller 305 includes a core metal layer, an elastic layer formed on an outer periphery of a shaft, and a releasable layer formed on an outer periphery of the elastic layer. The shaft is a steel use stainless (SUS) member having a diameter of 72 mm. The elastic layer is made of conductive silicone rubber having a thickness of 8 mm. The releasable layer has a thickness of 100 μm and is made of PFA as fluororesin. The pressing roller 305 is axially supported by a fixing frame of the fixing device F. A gear is fixed to one end portion of the pressing roller 305, and the pressing roller 305 is connected to a drive source M1 via the gear so as to be driven to rotate.

The pressing roller 305 and the heating roller 307 are connected to the drive source and the drive source M1, respectively, so as to be driven to rotate. The rotation of the pressing roller 305 and the heating roller 307 drives the belt 301 to rotate. The rotation of the belt 301 enables the belt 301 and the pressing roller 305 to convey the recording material P at the nip portion N. Pressure and heat are applied to the recording material P at the nip portion N to fix the toner image on the recording material P to the recording material P.

The applied pressure (NF) at the nip portion N in the fixing is set at 1600 N, and the nip portion N is set to have a width of 24.5 mm in the X-direction (the conveyance direction) and a width of 326 mm in the Y-direction (the sheet width direction).

The steering roller 308 is disposed on the inside of the belt 301. The steering roller 308 has a rotation center at one end thereof or near the center thereof, is rotated relative to the belt 301 to cause a difference in tension between the front and rear of the belt 301, and controls the position of the belt 301 in the Y-direction (the sheet width direction). The steering roller 308 is formed by a hollow SUS shaft having a diameter of 20 mm.

A rubber material can be provided to a surface of the steering roller 308 to increase a force for gripping the belt 301.

A spraying member D is disposed downstream of the nip portion N in the conveyance direction. The spraying member D sprays a gas on the recording material P.

The spraying member D sprays compressed air on the recording material P to separate the recording material P having passed through the nip portion N from the belt 301. The spraying member D includes an air nozzle 401, a bottom separation guide **400*b*, and a pair of sheet discharge rollers 400*a*. The compressed air is discharged from the air nozzle 401. The bottom separation guide 400*b* separates the recording material P from the pressing roller 305. The pair of sheet discharge rollers 400*a* discharges the separated recording material P outside the fixing device F. The pair of sheet discharge rollers 400*a*** is disposed about 40 mm downstream from the nip portion N in the conveyance direction.

A recording material detection unit 95 is disposed immediately before the nip portion N and detects timing of entry of the recording material P into the fixing device F.

Figure 3:
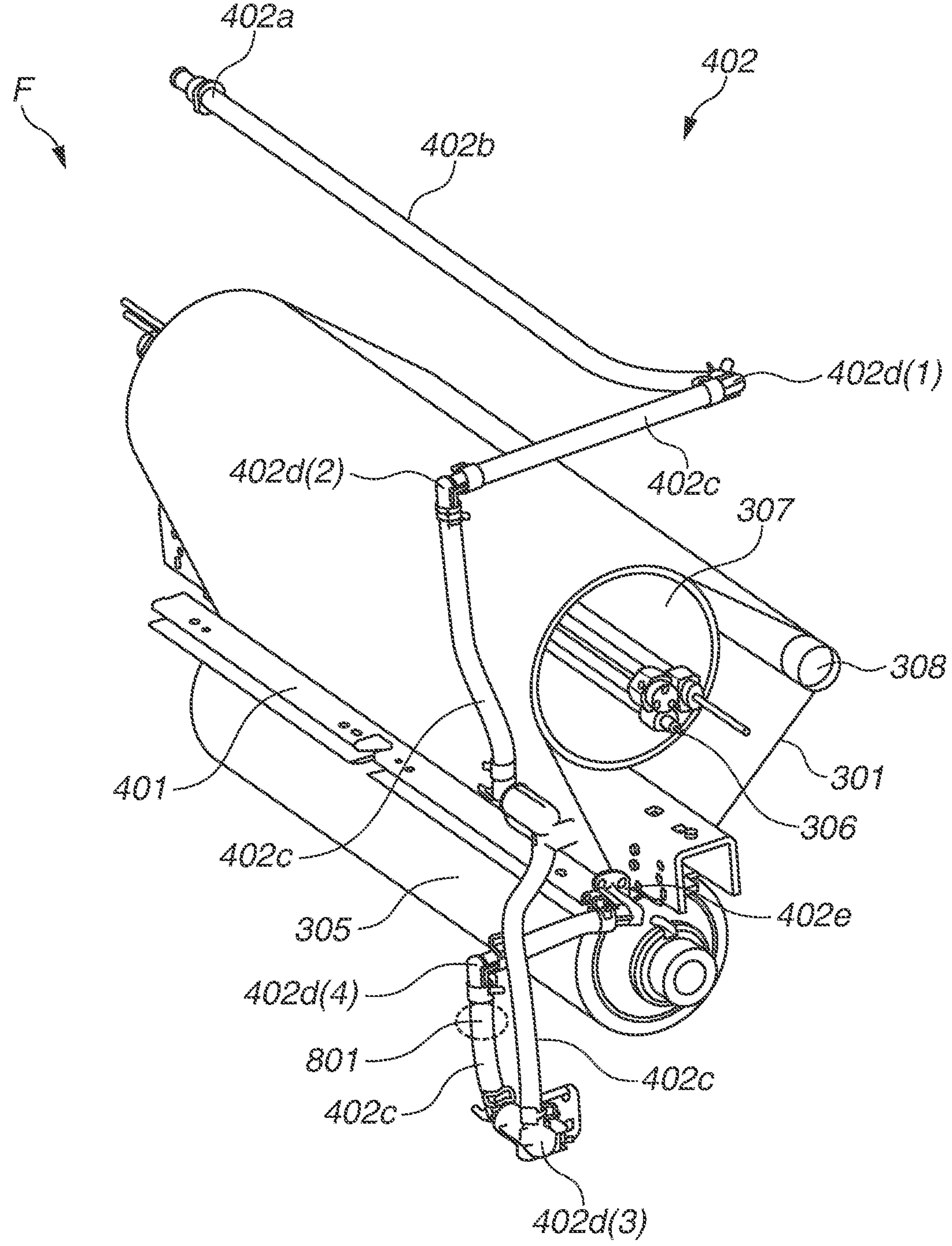
FIG. 3 is a perspective view illustrating the fixing device according to the first exemplary embodiment.
Figure 4:
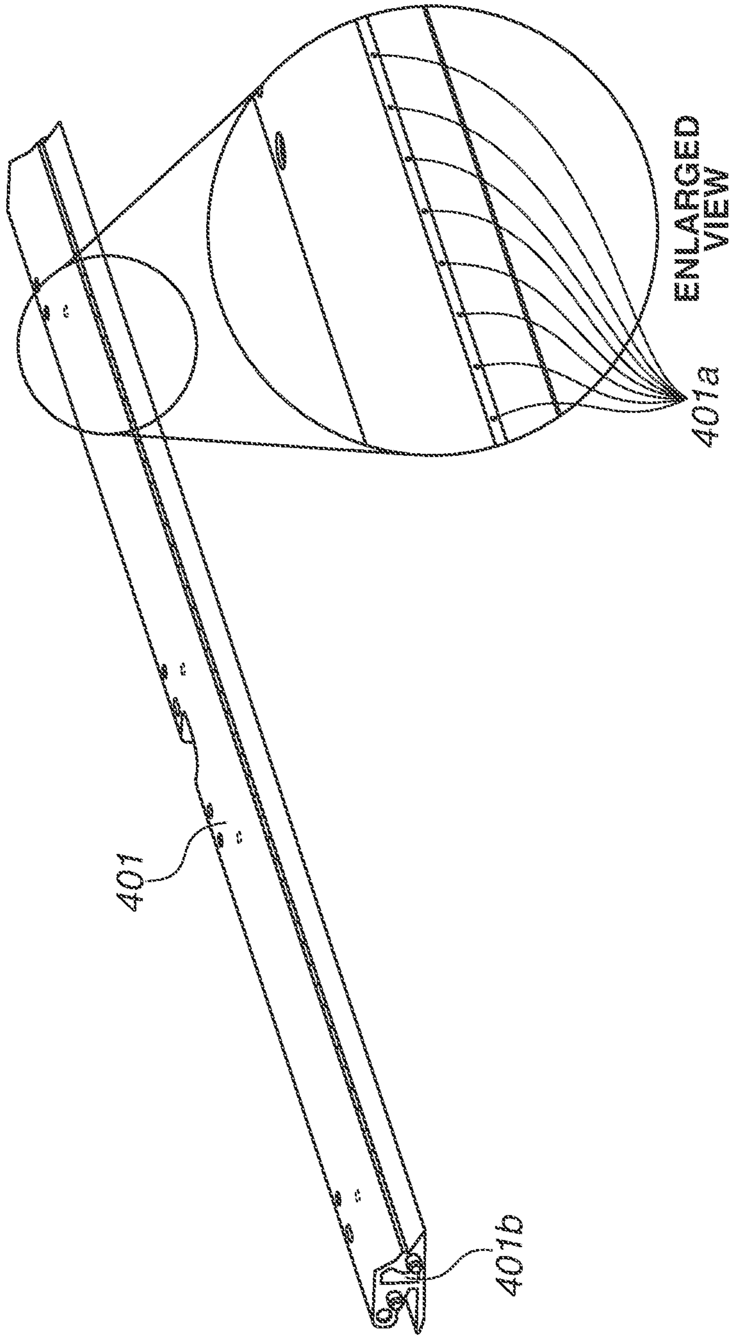
FIG. 4 is a perspective view illustrating an air nozzle according to the first exemplary embodiment.

FIG. 3 is a perspective view illustrating a main portion of the fixing device F, and FIG. 4 is a perspective view illustrating the air nozzle 401 alone. The air nozzle 401 is an aluminum member disposed substantially in parallel to and facing the belt 301 in the Y-direction. The air nozzle 401 includes about 30 to 50 nozzle holes **401*a* each having a diameter of about 0.5 mm to about 1.0 mm in a surface facing the belt 301. The compressed air generated by a compressor 96*a* (refer to FIG. 5) is guided into a space in the air nozzle 401 through an air nozzle inflow port 401*b* of the air nozzle 401 and is discharged from the nozzle holes 401*a***.

Next, an air path 402 for the compressed air in the fixing device F will be described in detail.

The fixing device F includes a fixing-side coupler **402*a* for feeding the compressed air into the fixing device F. An air heating member 402*b* (a first flow path) serving as a compressed air flow path is attached to one end of the fixing-side coupler 402*a*. A plurality of tube joints 402*d* (402*d*(1) to 402*d*(4)) and a plurality of air tubes 402*c* are connected to the other end of the air heating member 402*b* and form a continuous flow path. An air pipe 402*e* is attached to the most downstream end of the flow path and forms a flow path to the air nozzle inflow port 401*b* of the air nozzle 401. The flow path from the air tubes 402*c* to the air pipe 402*e* is a second flow path according to the present exemplary embodiment. The second flow path according to the present exemplary embodiment connects the first flow path and the air nozzle 401 and is connected at least to the air nozzle 401. As a result, the compressed air from the fixing-side coupler 402*a* is guided into the space in the air nozzle 401. The second flow path is located outside the belt 301** in the Y-direction.

The air heating member **402*b* and the air tubes 402*c* are, for example, rubber tubes formed using a heat-resistant material, such as silicone rubber, and each having an inner diameter of about 9 mm and a thickness of about 1 mm. The air heating member 402*b* is laid out from the rear to front of the fixing device F in the sheet width direction (the Y direction) in the fixing device F. This path is arranged so that, in a case where the belt 301 is projected in an upward pressing direction (a +Z direction), at least some part thereof faces the projected area without an obstacle. As a result, the air heating member 402***b* is heated to about 80° C. to about 100° C. by heat from the belt 301 while the image forming apparatus 1 is operated.

The tube joints 402*d* are formed using, for example, aluminum or heat-resistant resin and form a bent flow path. One tube joint 402*d* is disposed between two air tube 402*c* to route the air heating member 402*b* and the air tubes 402*c* in various directions without bending or buckling the air heating member 402*b* and the air tubes 402*c*.

<Spraying Member>

Figure 5:
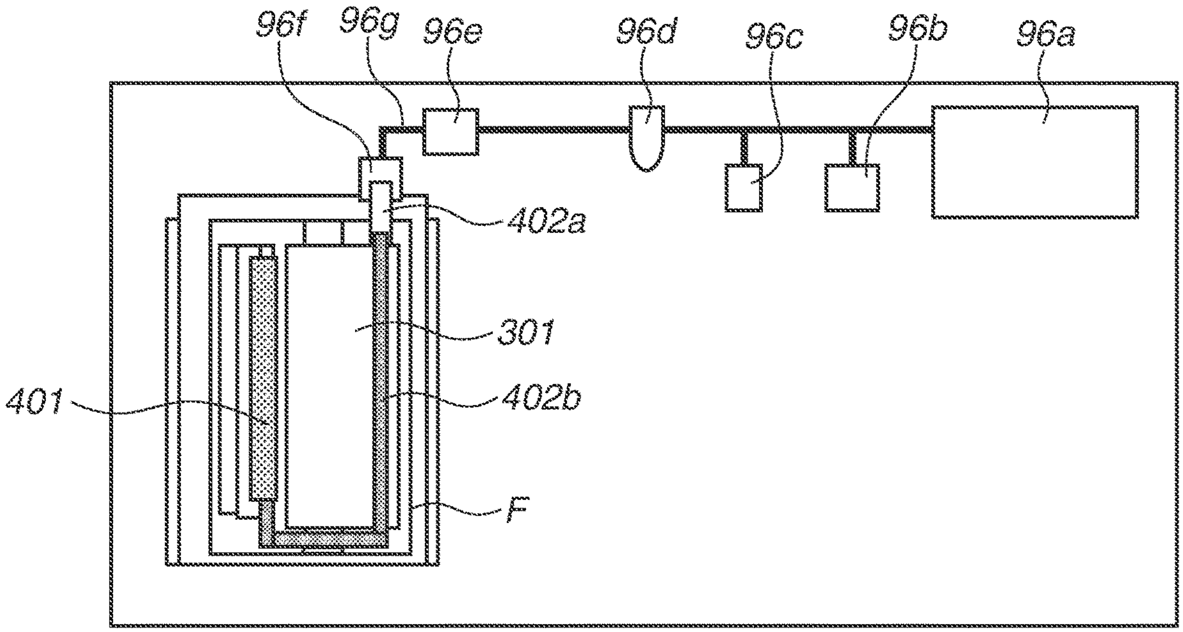
FIG. 5 is a top view illustrating a spraying member according the first exemplary embodiment.

FIG. 5 is a schematic top cross-sectional view of the image forming apparatus 1.

In the image forming apparatus 1, the spraying member D includes the compressor 96*a* and a pressure-releasing solenoid valve 96*b*. The compressor 96*a* generates compressed air. The pressure-releasing solenoid valve 96*b* is used to release the pressure in a piping tube 96*g*. The spraying member D also includes a pressure regulating valve 96*c* and an air filter 96*d*. The pressure regulating valve 96*c* regulates the pressure in the piping tube 96*g* and maintains the pressure at a predetermined pressure. The air filter 96*d* filters out drained waste, debris, and dust in the piping tube 96*g*. Further, in the spraying member D, a spraying solenoid valve 96*e* and a body-side coupler 96*f* are connected together by the piping tube 96*g*. The spraying solenoid valve 96*e* is used to send the compressed air to the air nozzle 401 to spray the compressed air on the leading edge of the recording material P.

The compressor 96*a* is located closer to a rear side of the image forming apparatus 1 than the fixing device F is, as illustrated in FIG. 5. The second flow path is located closer to a front side of the image forming apparatus 1 than the fixing device F is. Since the compressor 96*a* is a large device, the compressor 96*a* is disposed closer to the rear side of the image forming apparatus 1 to secure space.

The body-side coupler 96*f* is a coupling member that is connected to the fixing-side coupler 402*a* for piping connection to the air nozzle 401 in the spraying member D.

After the compressor 96*a* is activated, the pressure-releasing solenoid valve 96*b* is closed to accumulate the compressed air having the pressure regulated by the pressure regulating valve 96*c* in the piping tube 96*g* up to the spraying solenoid valve 96*e*. In the present exemplary embodiment, the pressure regulating valve 96*c* regulates the pressure in the piping tube 96*g* to 0.2 MPa to 0.3 MPa.

<Occurrence of Gloss Unevenness>

The spraying member D of the image forming apparatus 1 according to the present exemplary embodiment separates the recording material P from the surface of the belt 301. This prevents jamming caused by the failure of the separation in the fixing device F.

The spraying member D according to the present exemplary embodiment generates compressed air using the compressor 96*a* and discharges the compressed air from the nozzle holes 401*a*, which are fine holes. This facilitates the separation of the recording material P from the belt 301.

However, since the nozzle holes 401*a* are fine and the air discharged therefrom is compressed air, the discharged air hits some regions of the recording material P but does not hit other regions of the recording material P. Consequently, the regions hit by the compressed air are cooled rapidly, and glossiness of the toner image is maintained in the cooled regions. On the contrary, in the regions not hit by the compressed air, the melting of the toner progresses slightly by the heat applied in the fixing operation. As the melting of the toner progresses, the glossiness decreases. This may cause a difference in glossiness between the regions hit by the compressed air and the regions not hit by the compressed air, resulting in gloss unevenness.

The image forming apparatus 1 according to the present exemplary embodiment addresses the foregoing issue by discharging the compressed air during preliminary rotation. Details thereof will be described below.

<Air Flow Path Heating Control>

Figure 6:
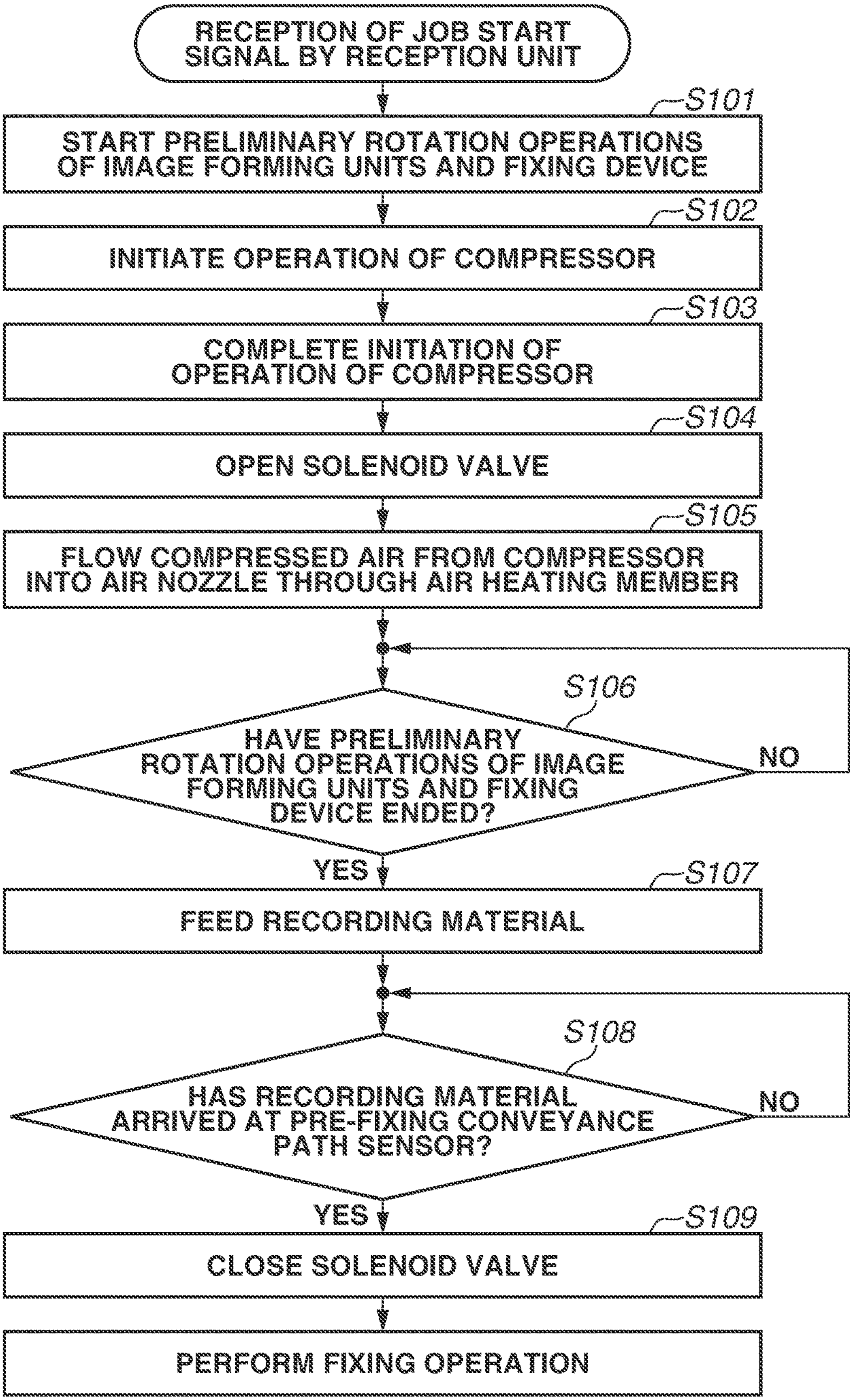
FIG. 6 is a flowchart illustrating air flow path heating control according to the first exemplary embodiment.

A procedure for control by the spraying member D (air flow path heating control) will be described with reference to a flowchart in FIG. 6. The image forming apparatus 1 includes a reception unit configured to receive jobs.

Figure 7:
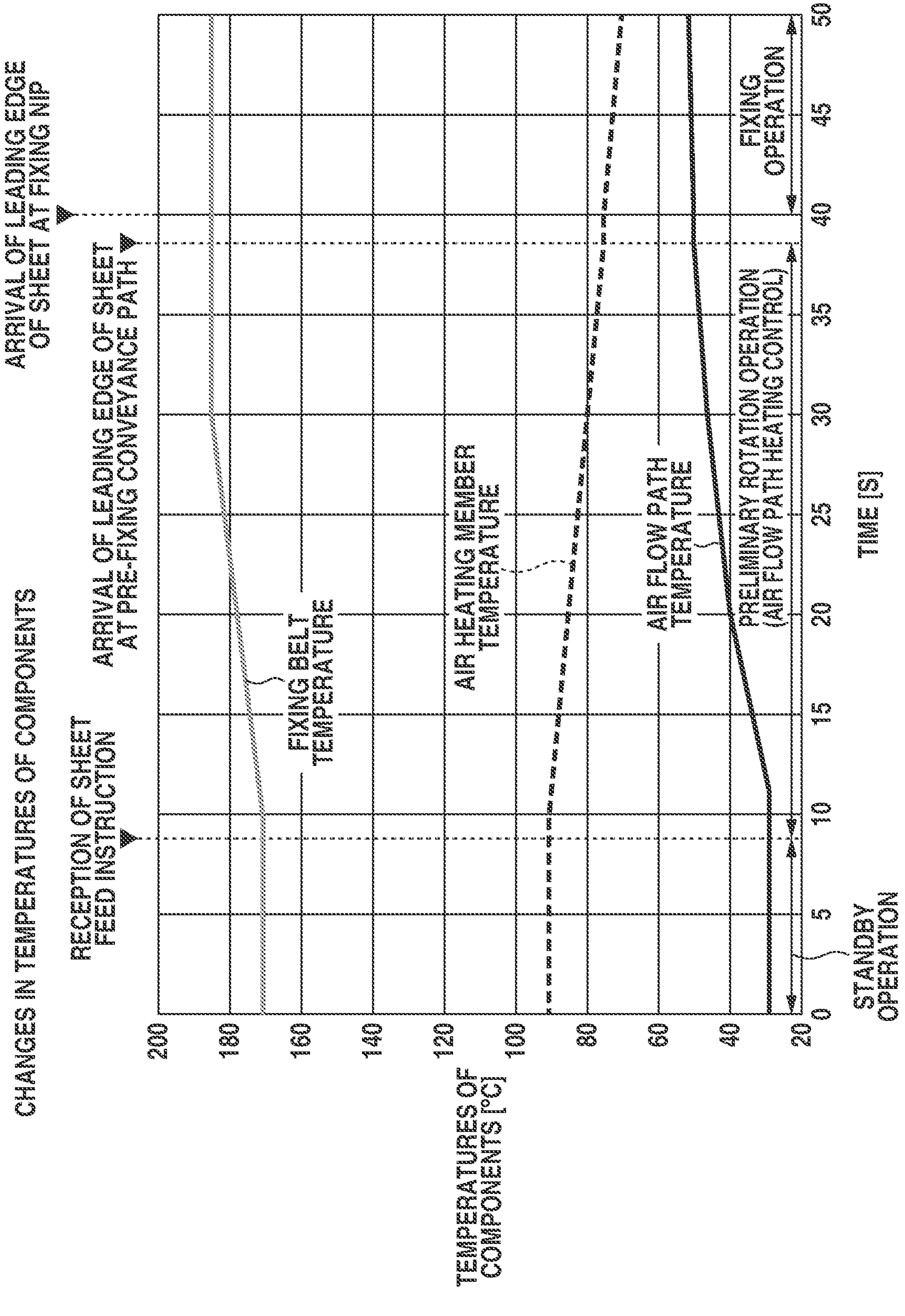
FIG. 7 is a diagram illustrating changes in temperatures of components according to the first exemplary embodiment.

In step S101, when the reception unit receives an image formation start instruction signal from an operation unit 4 or an external interface (I/F), the image forming units Pa to Pd start preliminary rotation operations for image formation, such as agitation operations for charging the toners stored in the development devices 202*a*, 202*b*, 202*c*, 202*d* and operations for regulating the voltage of the intermediate transfer belt 204. In parallel with the preliminary rotation operations of the image forming units Pa to Pd, the fixing device F starts a preliminary rotation operation for the fixing operation, which is an operation for controlling a belt surface temperature to a target temperature for sheet feeding. In the present exemplary embodiment, sheets of plain paper having a grammage of 80 grams per square meter (gsm) are assumed to be fed, and the target temperature for sheet feeding is 185° C. To increase a belt standby temperature of 170° C. before the preliminary rotation operation to the target temperature of 185° C., the heat source is powered on, and a temperature increase operation is performed. FIG. 7 illustrates changes in temperatures of the belt 301, the air heating member 402*b*, and the air flow path after the start of the preliminary rotation operation. The temperature of the air flow path (the air flow path temperature) is a temperature measured by a thermocouple (at a position 801 in FIG. 3) inserted from the corresponding tube joint 402*d* into the corresponding air tube 402*c* so as not to be in contact with an inner surface of the air tube 402*c*. Since the thermocouple is not in contact with the inner surface of the air tube 402*c*, the thermocouple measures the temperature of the air in the air tube 402*c*. The temperature of the air heating member 402*b* (the air heating member temperature) is a temperature detected by a thermocouple attached to a surface of the air heating member 402*b*, and the temperature of the belt 301 (the fixing belt temperature) is a temperature detected by a thermistor attached on an inner surface of the belt 301. The operations performed in a period after the reception of a job by the reception unit and before the feeding of the recording material P from the recording material cassette 8 or 9 are collectively referred to as preliminary rotation.

The temperature of the belt 301 is detected by the thermistor attached on the inner surface of the belt 301.

In step S102, during the preliminary rotation operation, the compressor 96*a* configured to generate compressed air starts a compressed air generation operation.

In step S103, the pressure of the compressed air in the piping tube 96*g* reaches 0.2 MPa to 0.3 MPa.

In step S104, the spraying solenoid valve 96*e* is opened.

In step S105, the compressed air in an amount greater than or equal to a predetermined amount is flowed from the compressor 96*a* into the air nozzle 401. At this time, the compressed air from the compressor 96*a* passes through the air heating member 402*b* and then reaches the air nozzle 401, so that the air flow path temperature increases (as indicated by a solid black line in FIG. 7). On the contrary, the compressed air close to the ambient temperature in the compressor 96*a* is continuously flowed into the air heating member 402*b*, so that the temperature of the air heating member 402*b* decreases (as indicated by a dashed black line in FIG. 7). The term "predetermined amount" herein refers to an amount for sufficiently increasing the air flow path temperature, and the predetermined amount according to the present exemplary embodiment is an amount for increasing the air flow path temperature to 50° C. The predetermined amount is not limited to the foregoing amount. The predetermined amount can refer to an amount of gas in the second flow path before the reception of a job by the reception unit. Since the gas in the second flow path before the reception of a job by the reception unit is unheated, it is desirable to discharge the gas from the second flow path before the recording material P reaches the nip portion N.

In step S106, once the temperature of the belt 301 has reached the target temperature for sheet feeding, i.e., 185° C. (as indicated by a solid gray line in FIG. 7), the preliminary rotation operation of the fixing device F is ended, and the preliminary rotation operations of the image forming units Pa to Pd are also ended.

In a case where the control unit 30 determines, in step S106, that the temperature of the belt 301 has reached the target temperature (YES in step S106), then in step S107, the recording material P is fed from the recording material cassette 8 or 9.

In step S108, the leading edge of the fed recording material P reaches a pre-fixing conveyance path sensor 94 (refer to FIG. 1).

In step S109, the spraying solenoid valve 96*e* is closed, and the inflow of the compressed air is stopped. At this time, because the compressed air having passed through the air heating member 402*b* heated to about 75° C. to 90° C. has been flowed into the air nozzle 401 for nearly 25 seconds, the air flow path temperature increases to about 50° C. (as indicated by the solid black line in FIG. 7).

Even in a case where the preliminary rotation is performed for a long time, such as nearly 120 seconds, due to a transfer belt cleaning operation during the preliminary rotation operations of the image forming units Pa to Pd, the maximum air flow path temperature is about 65° C. This is because the inflow of the compressed air decreases the temperature of the air heating member 402*b* (as indicated by the dashed black line in FIG. 7), and heat is received from the belt 301 side while the decrease continues, so that the temperature is stabilized at about 65° C. Since the risk of discharging high-temperature compressed air above 65° C. onto the toner image is considered low and the air flow path temperature is stabilized at about 65° C., the present exemplary embodiment defines no conditions for ending the opening of the spraying solenoid valve 96*e* (step S104) in a case where the preliminary rotation is continued for a long time.

<Control by Spraying Member D in Fixing Operation>

The control by the spraying member D during a job will be described.

In a case where the recording material P passes through the pre-fixing conveyance path sensor 94 (refer to FIG. 1) and is fed into the fixing device F, the recording material detection unit 95 detects the leading edge of the recording material P. This detection timing is used as a reference time, and the spraying solenoid valve 96*e* is opened after a predetermined time from the reference time, so that the accumulated compressed air is sprayed on the leading edge of the recording material P to separate the recording material P from the belt 301.

The compressed air is sprayed on an area of 90 mm from the leading edge of the recording material P. More specifically, the spraying member D sprays the compressed air on the area of 90 mm from the leading edge of the recording material P in the conveyance direction. Consequently, the area of 90 mm from the leading edge of the recording material P in the conveyance direction is separated from the belt 301. The accumulation of the compressed air in the compressor 96*a* is to be almost completed during an interval (hereinafter referred to as a sheet-to-sheet interval) after a sheet of the recording material P of the smallest size (which is 150 mm in the present exemplary embodiment) passes in the conveyance direction and before a leading edge of the next sheet of the recording material P arrives. The compressor 96*a* used in the present exemplary embodiment takes about 200 milliseconds (ms) to complete the accumulation. The fixing rotation speed is 630 mm/s, and the sheet-to-sheet distance is 90 mm. In this case, the sheet-to-sheet time interval is 140 ms, and the feeding time of the rest of the 150-mm recording material P after the area of 90 mm from the leading edge of the recording material P is 100 ms, which is 240 ms in total. Thus, a time longer than or equal to the time taken to complete the accumulation, i.e., 200 ms, is successfully secured.

The spraying of the compressed air on the area of 90 mm from the leading edge of the recording material P is performed also to secure an interval of about 40 mm or greater between where the area of 90 mm from the leading edge of the recording material P is discharged from the nip portion N and where the recording material P is nipped by the pair of sheet discharge rollers 400*a*. This is because spraying the compressed air before the recording material P is nipped by the pair of sheet discharge rollers 400*a* prevents a middle portion of the recording material P from winding around the belt 301.

<Effect on Nozzle Pitch Unevenness>

Next, an effect of performing the air flow path heating control according to the present exemplary embodiment will be described.

Figure 8:
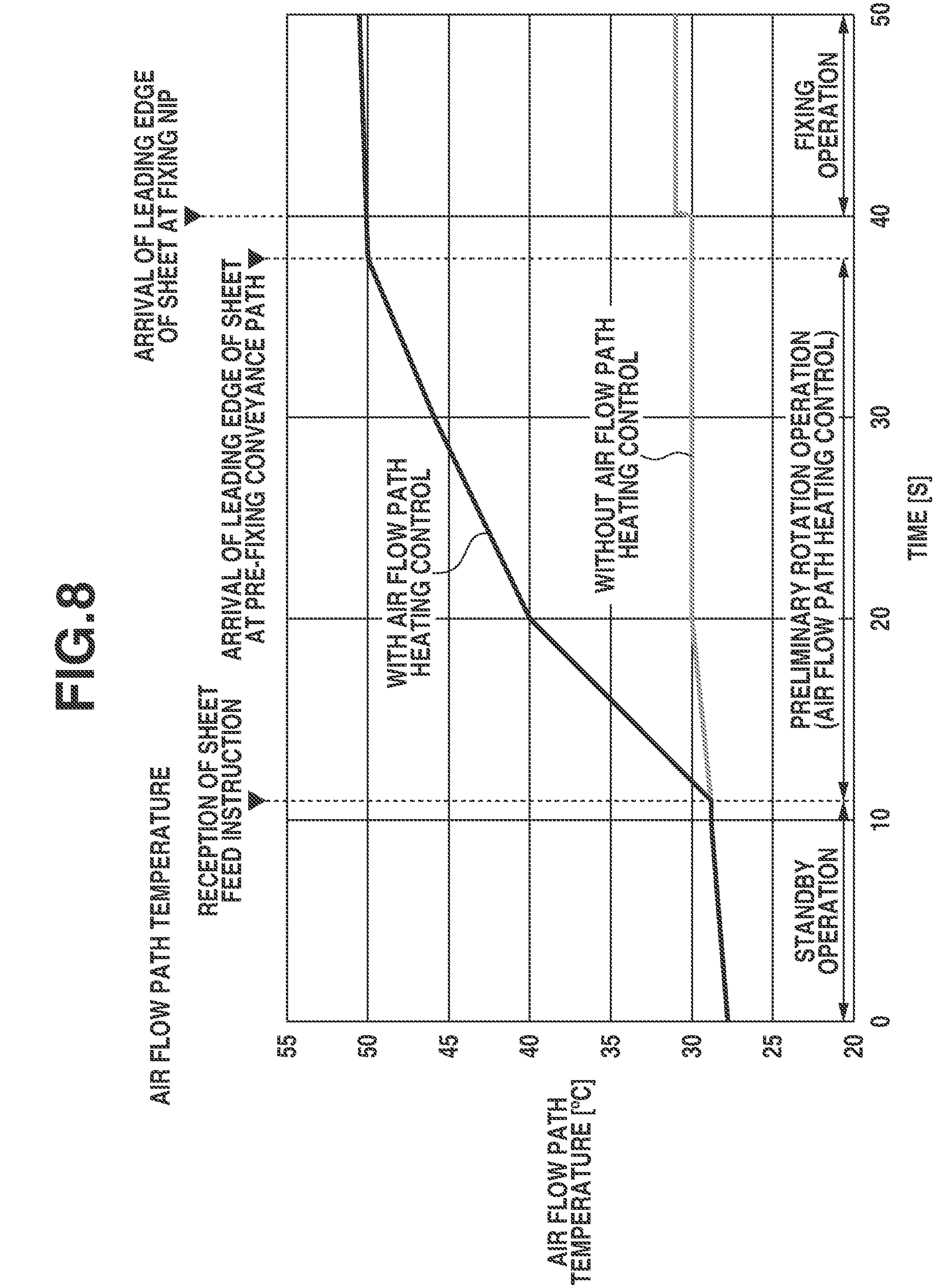
FIG. 8 is a diagram illustrating a comparison of air flow path temperature changes between the first exemplary embodiment and a conventional example.

To describe the effect, the change in the air flow path temperature measured in the case of reception of a sheet feed instruction will be compared between the present exemplary embodiment and a conventional example in FIG. 8. As described above, the air flow path temperature is the temperature measured by the thermocouple (at the position 801 in FIG. 3). The position 801 is located immediately upstream of the air nozzle 401 in the flow path and is where the gas immediately before being fed to the air nozzle 401 is stored.

As illustrated in FIG. 3, the air heating member 402*b* serving as the first flow path faces the belt 301 in the Y-direction. The air heating member 402*b* also faces a heating region in the Y-direction.

The heating region according to the present exemplary embodiment refers to a region where the heating roller 307 heats the belt 301 in the Y-direction. The air heating member 402*b* faces the heating region so that the temperature of the air heating member 402*b* can increase more easily.

The flow path from the air tubes 402*c* to the air pipe 402*e*, which is the second flow path, is located outside the belt 301 in the Y-direction. Since the second flow path is located outside the belt 301, the temperature of the second flow path does not increase easily, compared to that of the first flow path. Thus, the gas in the second flow path tends to be lower in temperature than the gas in the first flow path.

FIG. 8 illustrates a result of the measurement comparison. A solid black line in FIG. 8 represents the temperature change with the air flow path heating control according to the present exemplary embodiment. It takes about 27 seconds for the leading edge of the recording material P to reach the pre-fixing conveyance path sensor 94 upon receiving a sheet feed instruction. During this 27 seconds, the air flow path heating control according to the present exemplary embodiment is performed, and the compressed air in the compressor 96*a* passes through the heated air heating member 402*b* and continuously flows into the air nozzle 401, whereby the air flow path temperature (at the position 801 in FIG. 3) increases to 50° C.

A solid gray line in FIG. 8 represents the temperature change according to the conventional example without the air flow path heating control. In a case where the air flow path heating control is not performed as in the conventional example, the temperature measured by the thermocouple at the position 801 in the air flow path is about 30° C. In the conventional example, the temperature slightly increases from 28° C. to about 30° C. due to heat received from the heat source of the fixing device F.

Figure 9:
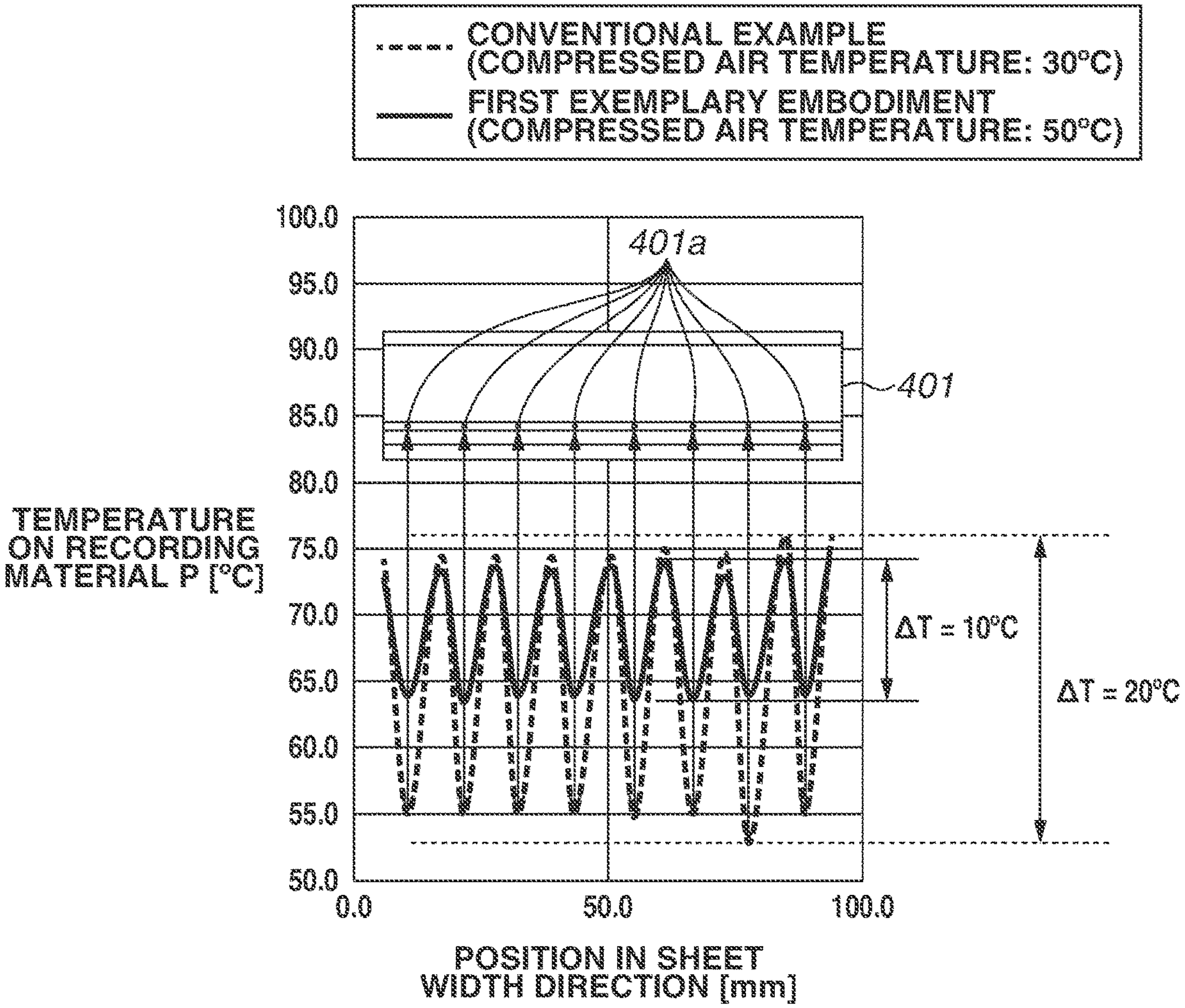
FIG. 9 is a diagram illustrating temperature distribution on a recording material P according to the first exemplary embodiment and according to the conventional example.
Figure 10:
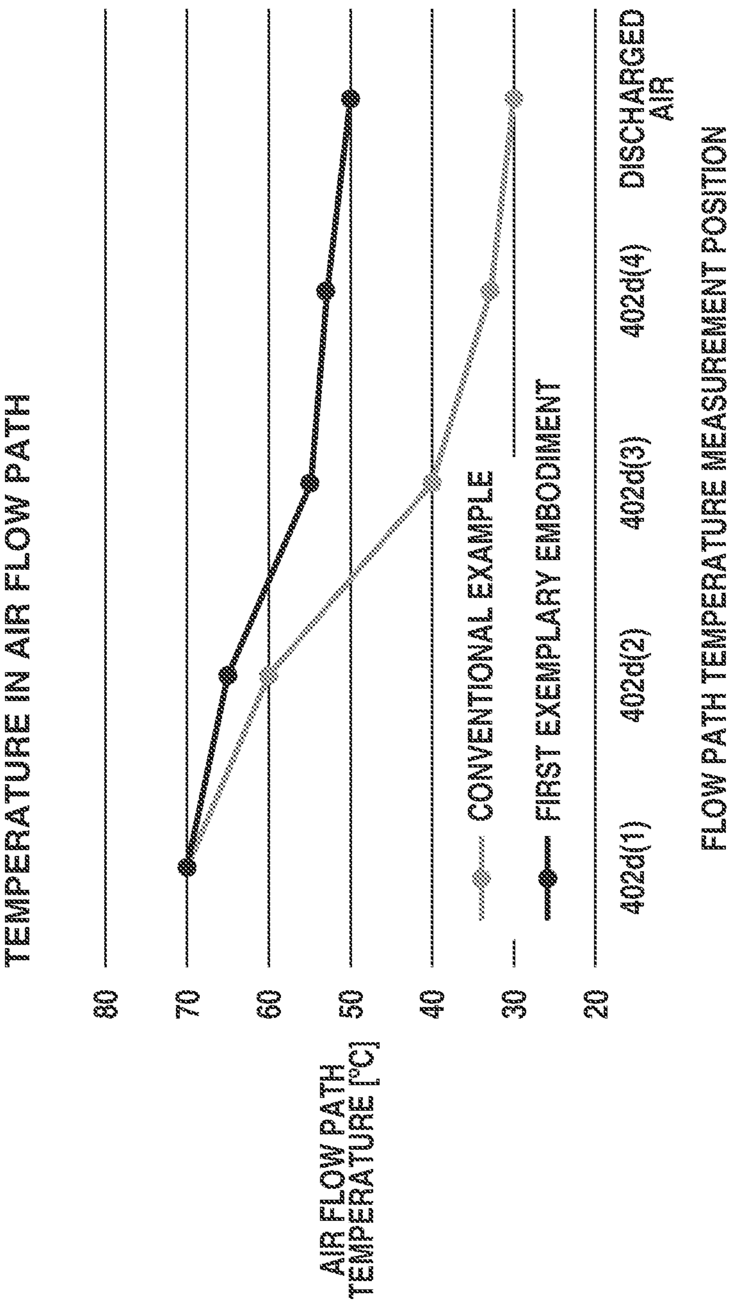
FIG. 10 is a diagram illustrating air flow path temperatures at different positions according to the first exemplary embodiment and according to the conventional example.

FIG. 9 illustrates temperature distribution on the recording material P immediately after the spraying of the compressed air on the recording material P. As illustrated in FIG. 9, temperatures at positions corresponding to the nozzle holes 401*a* in the sheet width direction are lower than temperatures at positions that do not correspond to the nozzle holes 401*a* in the sheet width direction. In the conventional example, the compressed air heated while passing through the air heating member 402*b* for the purpose of the separation of the recording material P reaches the air nozzle 401 when the leading edge of the recording material reaches the nip portion N and then is discharged from the nip portion N. Since the temperature in the air flow path to the air nozzle 401 is low and is about 30° C., the temperature of the compressed air discharged from the air nozzle 401 is about 30° C. FIG. 10 illustrates a relationship between an air flow path position and an air temperature. FIG. 10 illustrates results of measuring flow path temperatures using thermocouples installed from the tube joints 402*d*(1) to 402*d*(4) into the air tubes 402*c* so as not to be in contact with inner surfaces of the air tubes 402*c*. In the conventional example, as illustrated in FIG. 10, since the air flow path is lower in temperature than the heated compressed air, the temperature of the compressed air decreases to 30° C. by the time the compressed air is discharged to the toner on the recording material P, and a difference ΔT between the highest temperature portion and the lowest temperature portion on the toner surface is a maximum of 20° C. (refer to FIG. 9).

On the contrary, in the case where the air flow path heating control according to the present exemplary embodiment is performed, as illustrated FIG. 10, the temperature of the air flow path through which the compressed air heated while passing through the air heating member 402*b* reaches the air nozzle 401 is high and is about 50° C. Thus, the compressed air maintained at a high temperature of about 50° C. is discharged from the air nozzle 401. The difference ΔT between the highest temperature portion and the lowest temperature portion on the toner surface at the time of discharging the compressed air to the toner on the recording material P is a maximum of 10° C. (refer to FIG. 9).

As illustrated in FIG. 8, the air flow path heating control increases the temperature of the gas in the first flow path and the second flow path. More specifically, the temperature of the gas discharged during the job is higher than the temperature of the gas discharged during the air flow path heating control.

Figure 11:
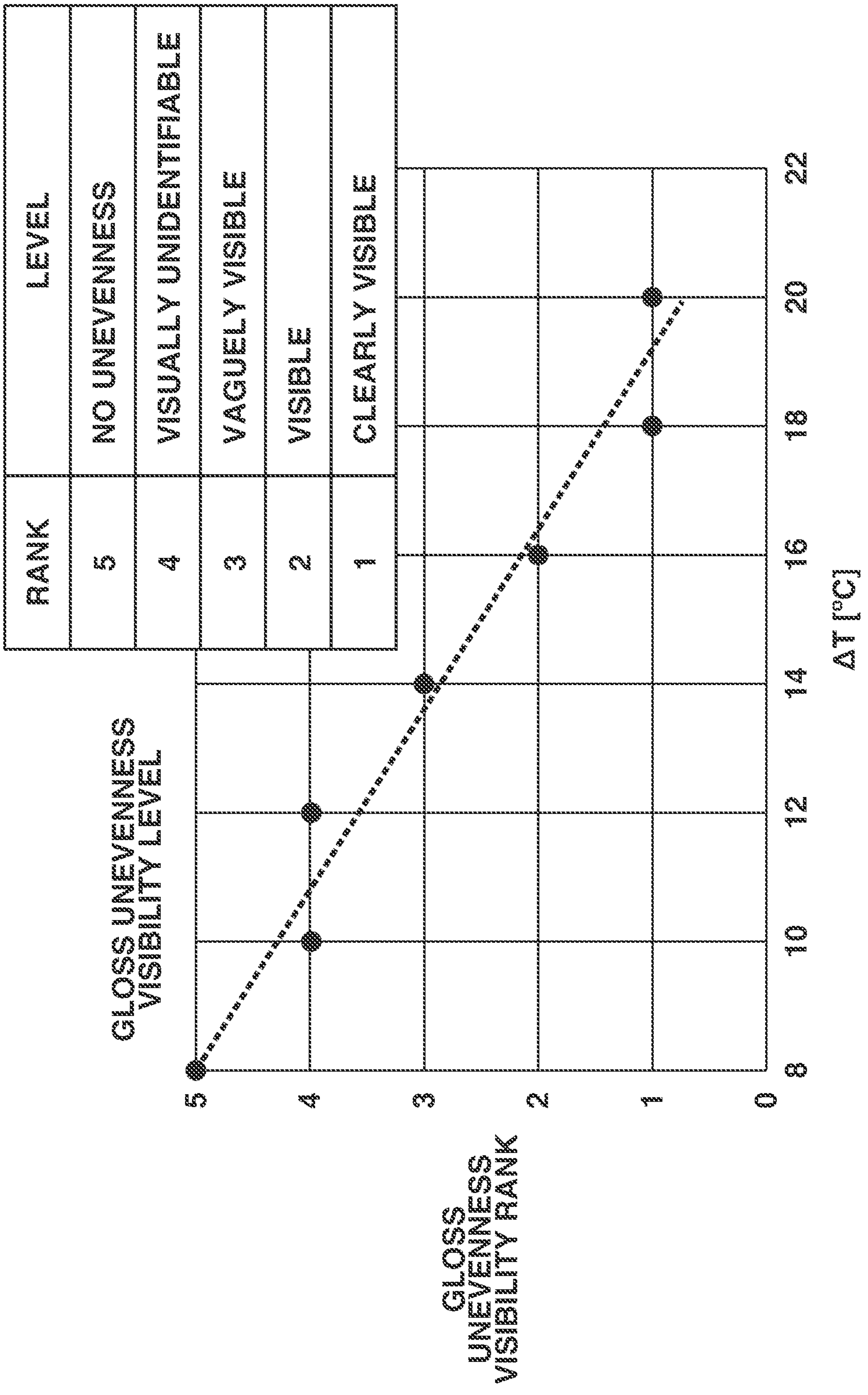
FIG. 11 is a diagram illustrating a relationship between a difference ΔT and gloss unevenness visibility.

FIG. 11 illustrates a relationship between the difference ΔT and a gloss unevenness visibility rank. By reducing the difference ΔT to 10° C., the visibility rank is improved to be at a visually unidentifiable level.

<Air Flow Path Heating Control in Preliminary Multiple Rotation>

Figure 12:
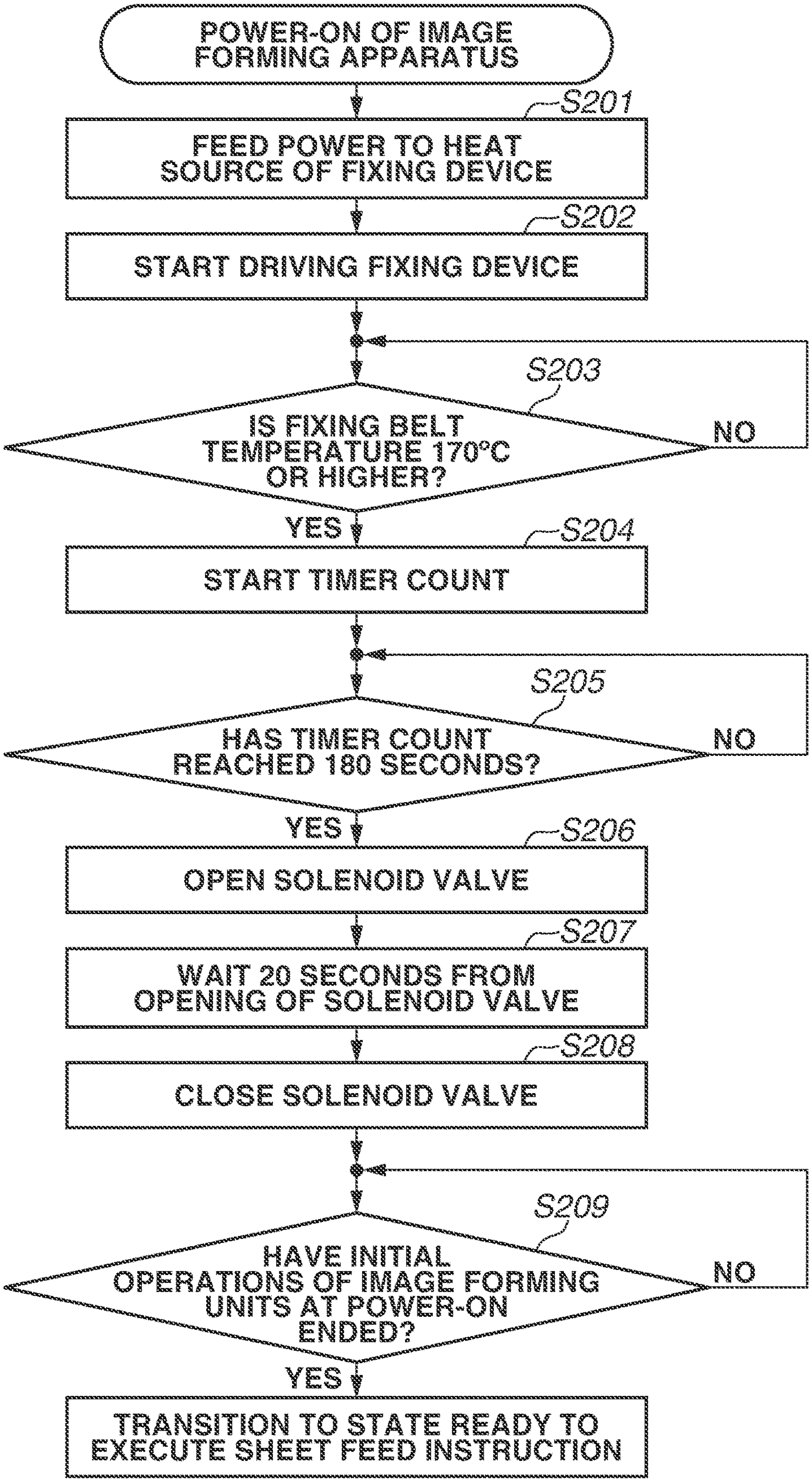
FIG. 12 is a flowchart illustrating air flow path heating control during preliminary multiple rotation according to a second exemplary embodiment.
Figure 13:
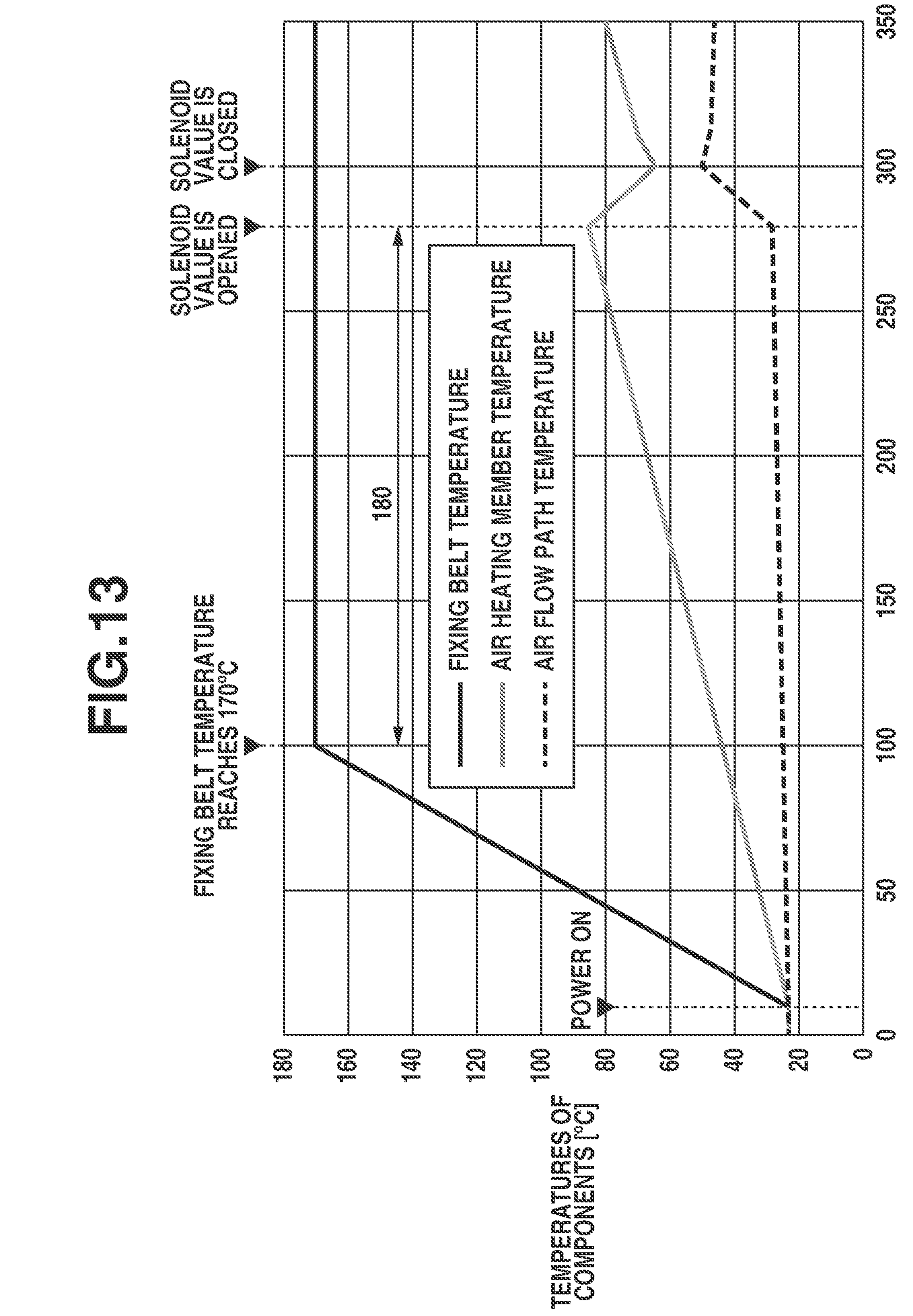
FIG. 13 is a diagram illustrating temperature changes during the preliminary multiple rotation according to the second exemplary embodiment.

In a second exemplary embodiment, the configuration of the fixing device F is the same as the configuration according to the first exemplary embodiment, but the air flow path heating control is performed also during an interval (preliminary multiple rotation) from the power-on of the image forming apparatus 1 to a transition to a state ready to execute a sheet feed instruction in addition to the preliminary rotation after the reception of a sheet feed instruction. FIG. 12 is a flowchart illustrating the air flow path heating control in the preliminary multiple rotation. FIG. 13 illustrates changes in temperatures of components during the air flow path heating control in the preliminary multiple rotation.

In step S201, when the image forming apparatus 1 is powered on, power is fed to the heat source of the fixing device F.

In step S202, the pressing roller 305 and the heating roller 307 are driven to start rotating, so that the belt 301 is rotated.

In step S203, the belt 301 receives heat from the heat source and the heating roller 307 while rotating, so that the temperature of the belt 301 starts increasing (as indicated by a solid black line in FIG. 13). Consequently, the fixing belt temperature reaches 170° C.

In step S204, a timer count is started. The image forming apparatus 1 includes a measurement unit. The measurement unit measures a standby time before the temperature of the air heating member 402*b* (the first flow path) reaches a predetermined temperature. The compressed air from the compressor 96*a* is flowed into the air heating member 402*b* after the temperature of the air heating member 402*b* increases to about 80° C. (as indicated by a solid gray line in FIG. 13), whereby the flow path heating efficiency is increased.

In step S205, the measurement unit measures 180 seconds as the standby time.

In step S206, the spraying solenoid valve 96*e* is opened.

In step S207, the compressed air from the compressor 96*a* passes through the air heating member 402*b* and continuously flows into the air nozzle 401 for 20 seconds. The compressed air having passed through the air heating member 402*b* heated to about 80° C. passes through the air tubes 402*c* and reaches the air nozzle 401, whereby the air flow path is heated to around 50° C. (indicated by a dashed black line in FIG. 13). As in the first exemplary embodiment, the air flow path temperature is the temperature measured by the thermocouple (at the position 801 in FIG. 3) inserted from the corresponding tube joint 402*d* into the corresponding air tube 402*c*.

In step S208, after a lapse of 20 seconds from the opening of the spraying solenoid valve 96*e*, the spraying solenoid valve 96*e* is closed.

In step S209, in a case where initial operations of the image forming units Pa to Pd at power-on have been completed, the fixing device F and the image forming units Pa to Pd are ready to perform a sheet feed operation, so that the image forming apparatus 1 transitions to a state ready to execute a sheet feed instruction.

<Effect on Nozzle Pitch Unevenness>

An effect of performing the air flow path heating control according to the present exemplary embodiment will be described.

To describe the effect, the change in the air flow path temperature measured in the case of reception of a sheet feed instruction is compared between the present exemplary embodiment and a conventional example, using the temperature measured by the above-described thermocouple (at the position 801 in FIG. 3) as the air flow path temperature.

Figure 14:
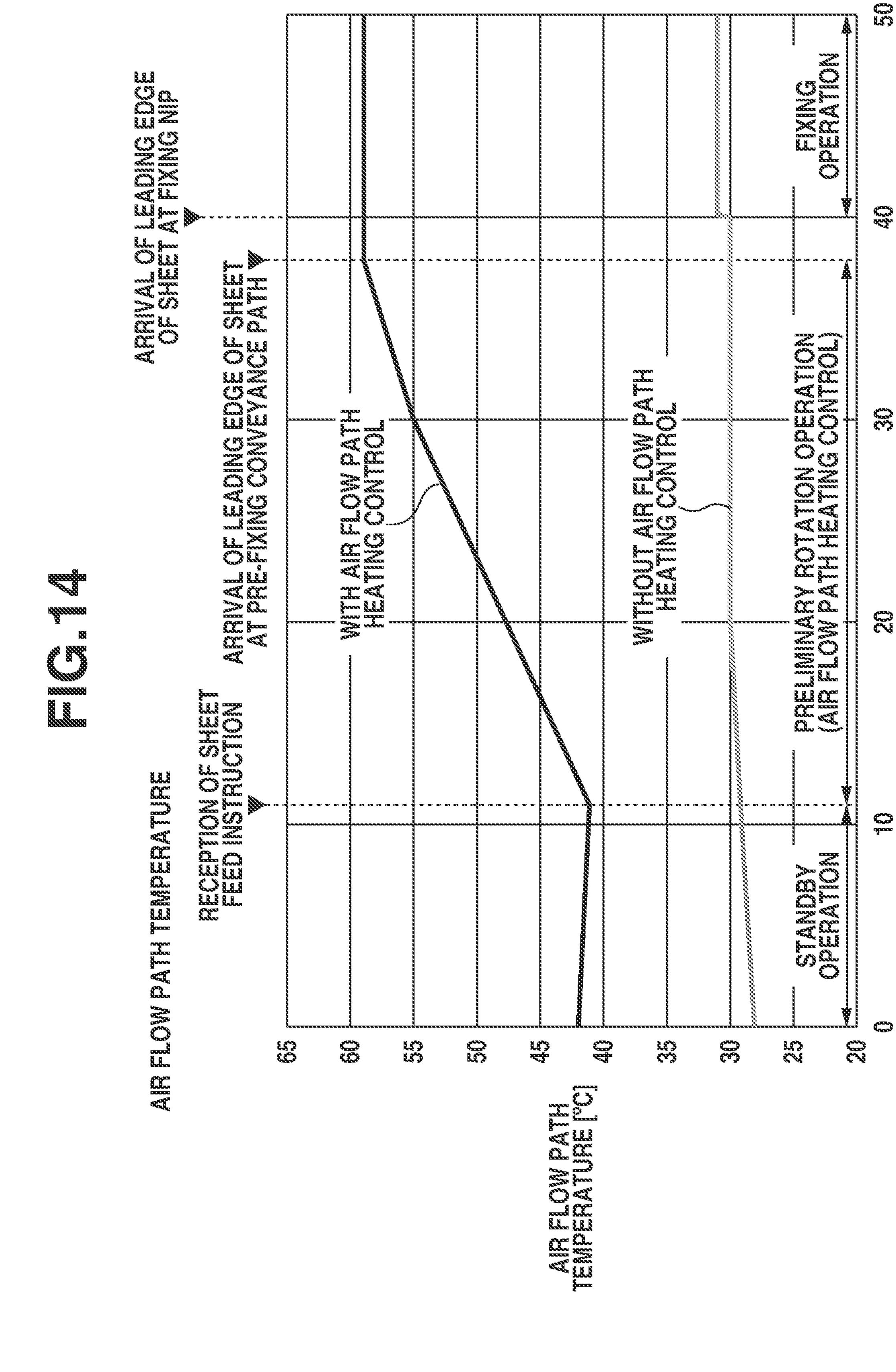
FIG. 14 is a diagram illustrating a comparison of air flow path temperature changes between the second exemplary embodiment and the conventional example.

FIG. 14 illustrates a result of the measurement comparison. A solid black line in FIG. 14 represents the temperature change with the air flow path heating control according to the present exemplary embodiment. By the time a sheet feed instruction is received, the air flow path temperature has been increased to about 46° C. This is because the air flow path heating control is performed during the preliminary multiple rotation at the power-on of the image forming apparatus 1. The air flow path temperature after the preliminary multiple rotation at the power-on of the image forming apparatus 1 is about 46° C. When about 5 minutes to 6 minutes have passed without receiving a sheet feed instruction, the air flow path temperature decreases from about 46° C. to about 40° C. After the passage of 6 minutes, the temperature stabilizes and is maintained at around 40° C. The measured temperatures that are compared herein are temperatures measured in the case of receiving a sheet feed instruction after a state without receiving a sheet feed instruction for about three minutes after the preliminary multiple rotation. It takes about 27 seconds for the leading edge of the recording material P to reach the pre-fixing conveyance path sensor 94. During this 27 seconds, the air flow path heating control according to the present exemplary embodiment is performed, and the compressed air in the compressor 96*a* passes through the heated air heating member 402*b* and continuously flows into the air nozzle 401, whereby the temperature measured by the thermocouple at the position 801 in the air flow path increases from 41° C. to 59° C.

On the other hand, a solid gray line in FIG. 14 represents the temperature change according to the conventional example without the air flow path heating control.

In a case where the air flow path heating control is not performed as in the conventional example, the temperature measured by the thermocouple at the position 801 in the air flow path is about 30° C. In the conventional example, the temperature increases from 28° C. to about 30° C. due to heat received from the heat source of the fixing device F, but the increase remains slight.

Figure 15:
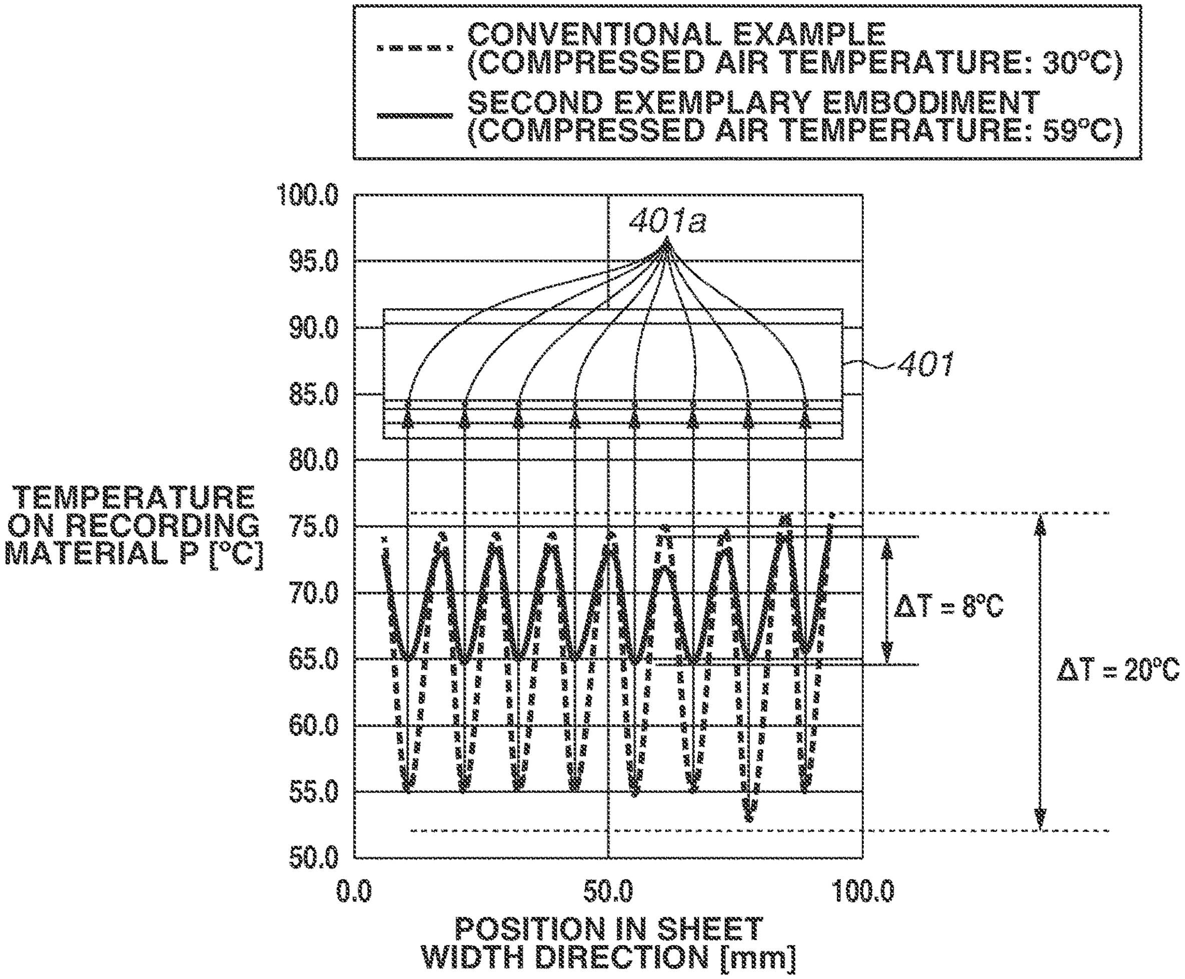
FIG. 15 is a diagram illustrating temperature distribution on the recording material P according to the second exemplary embodiment and according to the conventional example.
Figure 16:
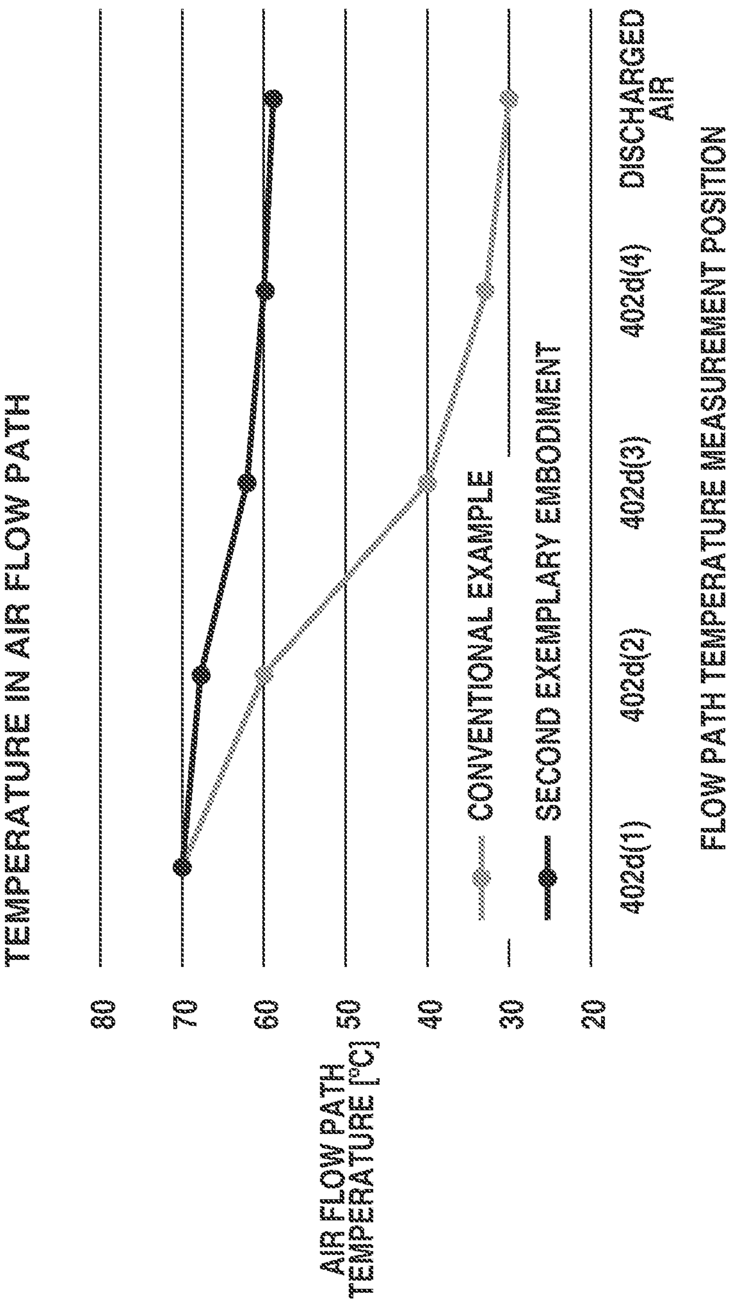
FIG. 16 is a diagram illustrating air flow path temperatures at different positions according to the second exemplary embodiment and according to the conventional example.

FIG. 15 illustrates temperature distribution on the recording material P immediately after the spraying of the compressed air on the recording material P. In the conventional example, the compressed air heated while passing through the air heating member 402*b* for the purpose of the separation of the recording material P reaches the air nozzle 401 when the leading edge of the recording material P reaches the nip portion N and then is discharged from the nip portion N. Since the temperature in the air flow path to the air nozzle 401 is low and is about 30° C., the temperature of the compressed air discharged from the air nozzle 401 is about 30° C. FIG. 16 illustrates a relationship between an air flow path position and an air temperature. FIG. 16 illustrates results of measuring flow path temperatures using the thermocouples installed from the tube joints 402*d*(1) to 402*d*(4) into the air tubes 402*c* so as not to be in contact with the inner surfaces of the air tubes 402*c*. In the conventional example, as illustrated in FIG. 16, since the air flow path is lower in temperature than the heated compressed air, the temperature of the compressed air decreases to 30° C. by the time the compressed air is discharged to the toner on the recording material P, and the difference ΔT between the highest temperature portion and the lowest temperature portion on the toner surface is a maximum of 20° C. (refer to FIG. 15).

On the contrary, in the case where the air flow path heating control according to the present exemplary embodiment is performed, as illustrated FIG. 16, the temperature of the air flow path through which the compressed air heated while passing through the air heating member 402*b* reaches the air nozzle 401 is high and is about 59° C. Thus, the compressed air maintained at a high temperature of about 59° C. is discharged from the air nozzle 401. The difference ΔT between the highest temperature portion and the lowest temperature portion on the toner surface at the time of discharging the compressed air to the toner on the recording material P is a maximum of 8° C. (refer to FIG. 15).

FIG. 11 illustrates the relationship between the difference ΔT and the gloss unevenness visibility rank. By reducing the difference ΔT to 8° C., the visibility rank is improved to be at a level without gloss unevenness.

By combining the air flow path heating control according to the first exemplary embodiment and the air flow path heating control in the preliminary multiple rotation according to the second exemplary embodiment, the temperature of the air in the air flow path is increased to a higher temperature, and gloss unevenness is reduced.

<Air Flow Path Heating Control in Preliminary Rotation Time Longer than Predetermined Time>

In a third exemplary embodiment, the configuration of the fixing device F is the same as the configuration according to the first exemplary embodiment, but the image forming apparatus 1 performs the air flow path heating control in a case where the preliminary rotation after the reception of a sheet feed instruction is longer than a predetermined time. For example, the air flow path heating control is performed in a case where the preliminary rotation time is nearly 120 seconds, which is a case where the transfer belt cleaning operation is performed during the preliminary rotation operation.

Figure 17:
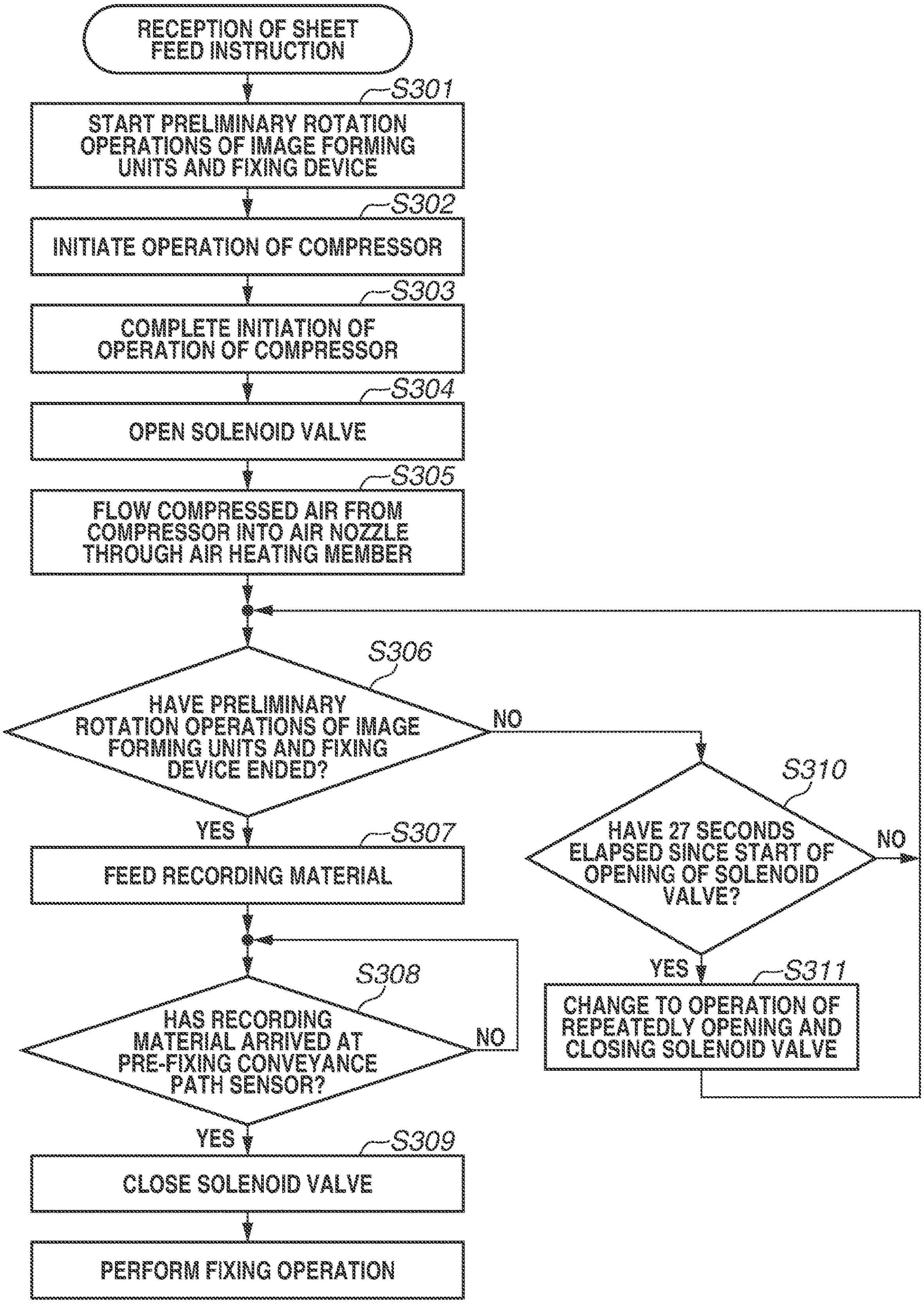
FIG. 17 is a flowchart illustrating air flow path heating control during preliminary rotation according to a third exemplary embodiment.

A procedure for control by the spraying member D (air flow path heating control) in a case where the reception unit receives a job will be described with reference to a control flowchart in FIG. 17.

In step S301, when the reception unit of the image forming apparatus 1 receives a sheet feed instruction, the image forming units Pa to Pd start the preliminary rotation operations for image formation, such as the agitation operations for charging the toners stored in the development devices 202*a*, 202*b*, 202*c*, 202*d* and the operations for regulating the voltage of the intermediate transfer belt 204. In parallel with the preliminary rotation operations of the image forming units Pa to Pd, the fixing device F starts the preliminary rotation operation for the fixing operation, which is the operation for controlling the belt surface temperature to the target temperature for sheet feeding. In the present exemplary embodiment, sheets of plain paper having a grammage of 80 gsm are assumed to be fed, and the target temperature is 185° C. To increase the belt standby temperature of 170° C. before the preliminary rotation operation to the target temperature of 185° C., the heat source is powered on, and the temperature increase operation is performed. The air flow path temperature is the temperature measured by the thermocouple (at the position 801 in FIG. 3) inserted from the corresponding tube joint 402*d* into the corresponding air tube 402*c* so as not to be in contact with the inner surface of the air tube 402*c*. Since the thermocouple is not in contact with the inner surface of the air tube 402*c*, the thermocouple measures the temperature of the air in the air tube 402*c*. The temperature of the air heating member 402*b* is the temperature detected by the thermocouple attached to the surface of the air heating member 402*b*, and the temperature of the belt 301 is the temperature detected by the thermistor attached on the inner surface of the belt 301.

In step S302, during the preliminary rotation operation, the compressor 96*a* configured to generate compressed air starts the compressed air generation operation.

In step S303, the pressure of the compressed air in the piping tube 96*g* reaches 0.2 MPa to 0.3 MPa.

In step S304, the spraying solenoid valve 96*e* is opened.

In step S305, the compressed air is flowed from the compressor 96*a* into the air nozzle 401. At this time, the compressed air from the compressor 96*a* passes through the air heating member 402*b* and then reaches the air nozzle 401, so that the air flow path temperature increases. On the contrary, the compressed air close to the ambient temperature in the compressor 96*a* is continuously flowed into the air heating member 402*b*, so that the temperature of the air heating member 402*b* decreases.

In step S306, once the temperature of the belt 301 has reached the target temperature for sheet feeding, i.e., 185° C., the preliminary rotation operation of the fixing device F is ended, and the preliminary rotation operations of the image forming units Pa to Pd are also ended.

In step S307, the recording material P is fed from the recording material cassette 8 or 9.

In step S308, the leading edge of the fed recording material P reaches the pre-fixing conveyance path sensor 94 (refer to FIG. 1).

In step S309, the spraying solenoid valve 96*e* is closed, and the inflow of the compressed air is stopped.

In a case where the preliminary rotation operation of the fixing device F and the preliminary rotation operations of the image forming units Pa to Pd are not ended (in a case where the transfer belt cleaning operation is performed) (NO in step S306), the preliminary rotation is continuously performed and the processing proceeds to step S310. In step S310, whether 27 seconds have elapsed since the start of opening the spraying solenoid valve 96*e* is determined.

In a case where 27 seconds have elapsed since the start of opening the spraying solenoid valve 96*e* (YES in step S310), then in step S311, the operation of continuously opening the spraying solenoid valve 96*e* is changed to the operation of repeatedly opening and closing the spraying solenoid valve 96*e*. In the present exemplary embodiment, the operation of repeatedly opening and closing the spraying solenoid valve 96*e* is performed as a method for reducing the amount of inflow of the compressed air compared to the operation of continuously opening the spraying solenoid valve 96*e*, but a method for reducing the compressed air itself can be used as an alternative method. Examples thereof include a method of flowing the compressed air with the spraying solenoid valve 96*e* opened slightly and a method of reducing the pressure of the compressor 96*a*.

Figure 21A:
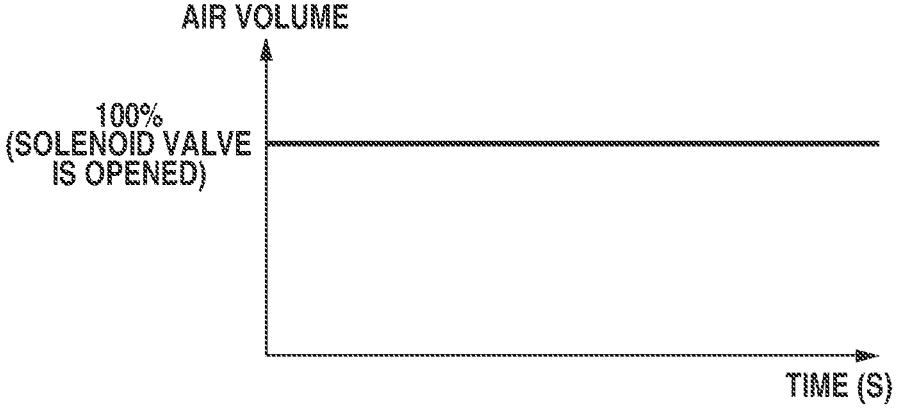
FIGS. 21A, 21B, and 21C are diagrams illustrating air volume changes by various types of control including control according to the third exemplary embodiment.
Figure 21B:
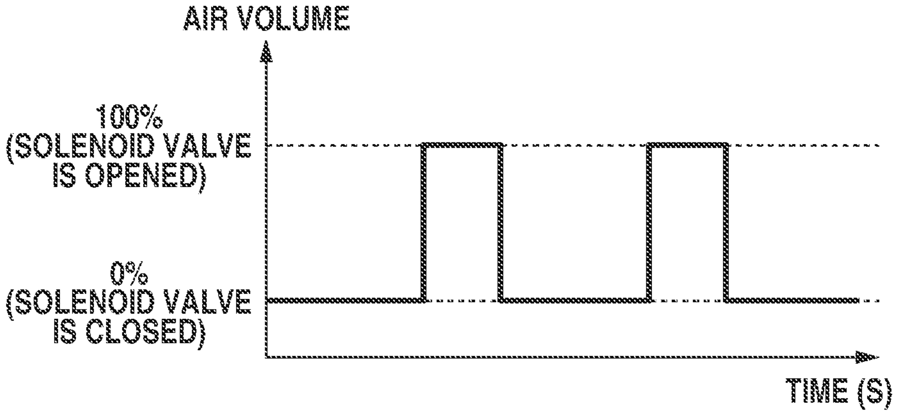
Figure 21C:
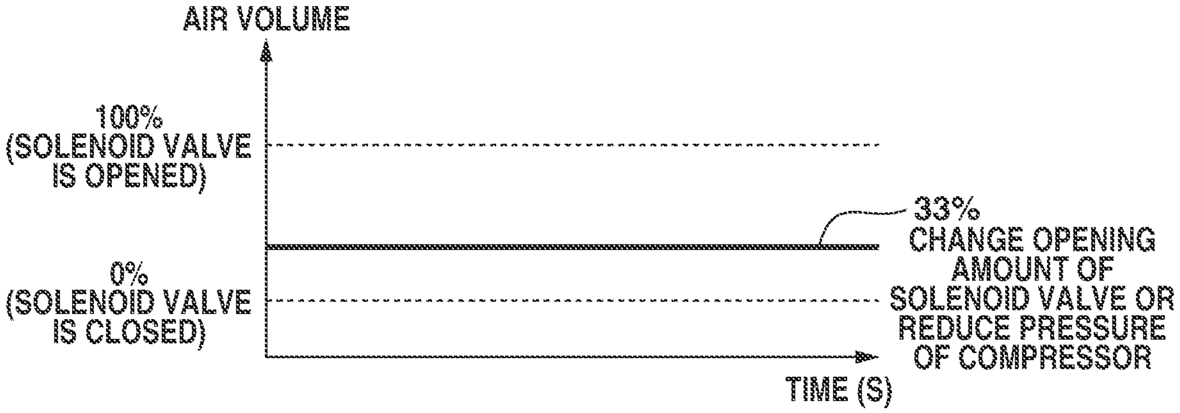

FIGS. 21A to 21C illustrate examples of air volumes in the case of performing the foregoing operations. More specifically, FIG. 21A illustrates the operation of continuously opening the spraying solenoid valve 96*e*. FIG. 21B illustrates the operation of repeatedly opening and closing the spraying solenoid valve 96*e* according to the present exemplary embodiment. FIG. 21C illustrates the operation of flowing the compressed air with the spraying solenoid valve 96*e* opened slightly or the operation of reducing the pressure of the compressor 96*a*.

The processing then returns to step S306 to determine again whether the preliminary rotation operation of the fixing device F and the preliminary rotation operations of the image forming units Pa to Pd are ended.

<Effect on Nozzle Pitch Unevenness>

Next, an effect of performing the air flow path heating control according to the present exemplary embodiment will be described.

To describe the effect, the change in the air flow path temperature measured in the case of reception of a sheet feed instruction is compared between the present exemplary embodiment (the operation of repeatedly opening and closing the spraying solenoid valve 96*e*) and the operation of continuously opening the spraying solenoid valve 96*e*. As described above, the air flow path temperature is the temperature measured by the thermocouple (at the position 801 in FIG. 3).

Figure 18:
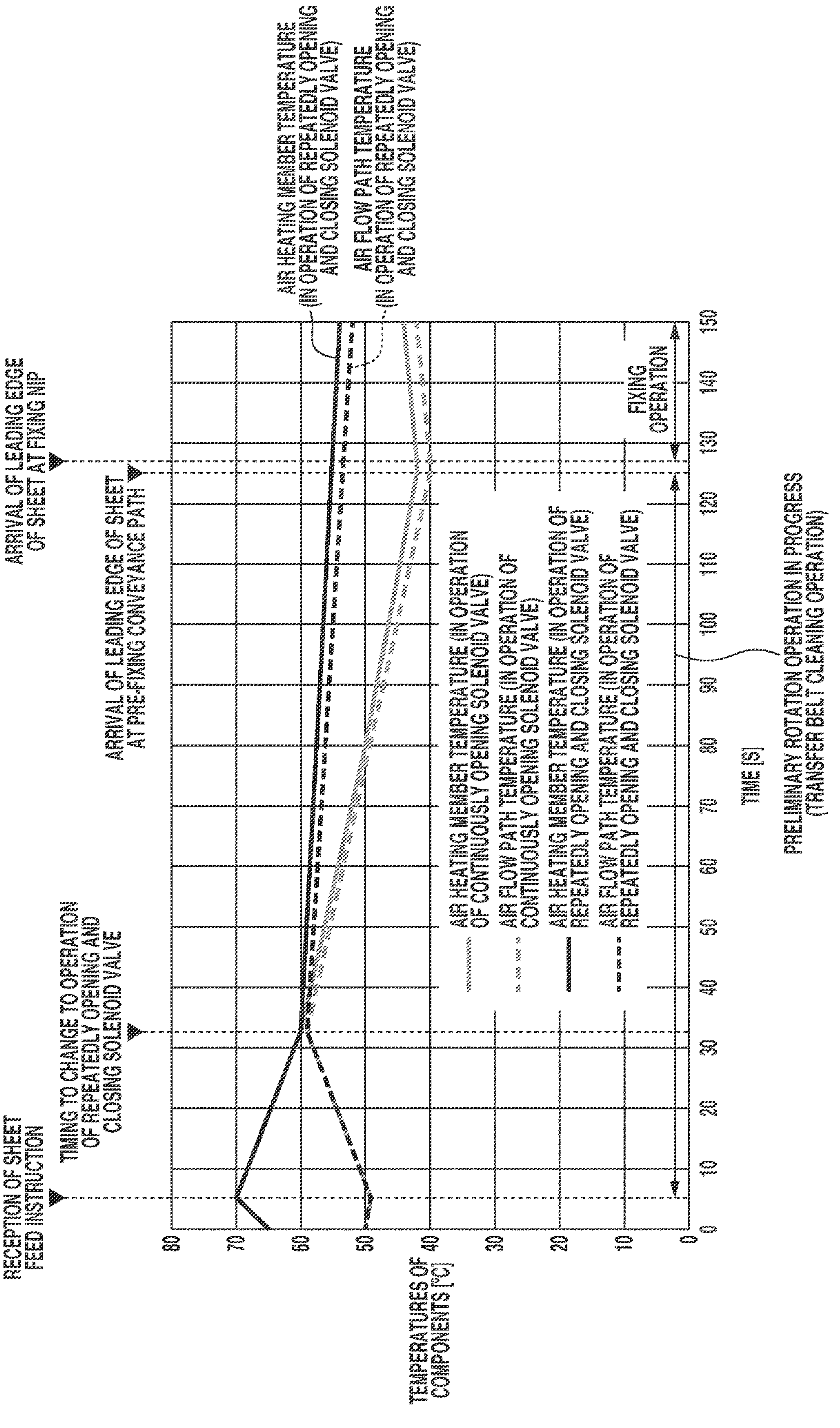
FIG. 18 is a diagram illustrating changes in temperatures of components according to the third exemplary embodiment.

FIG. 18 illustrates results of the measurement comparison. Upon reception of a sheet feed instruction, the preliminary rotation operation is started. The air flow path heating control is started at this timing, and the state where the spraying solenoid valve 96*e* remains opened is maintained for 27 seconds. After a lapse of 27 seconds, the timing to change to the operation of repeatedly opening and closing the spraying solenoid valve 96*e* arrives. A solid gray line (indicating the temperature of the air heating member 402*b*) and a dashed gray line (indicating the air flow path temperature) represent the temperature changes in the case of the operation of continuously opening the spraying solenoid valve 96*e*. Unlike those described above, a solid black line (indicating the temperature of the air heating member 402*b*) and a dashed black line (indicating the air flow path temperature) represent the temperature changes in the case of changing to the operation of repeatedly opening and closing the spraying solenoid valve 96*e* according to the present exemplary embodiment. The results indicate that, in the case of the operation of continuously opening the spraying solenoid valve 96*e*, since the compressed air is continuously flowed into the air heating member 402*b*, the temperature of the air heating member 402*b* decreases continuously. Consequently, the temperature of the air flow path also decreases. On the contrary, in the case of the operation of repeatedly opening and closing the spraying solenoid valve 96*e*, since the compressed air inflow operation and the operation of stopping the inflow of the compressed air are repeated, the amount of inflow of the compressed air close to the ambient temperature in the compressor 96*a* decreases and the temperatures of the air heating member 402*b* and the air flow path increase compared to the operation of continuously opening the spraying solenoid valve 96*e*. At the timing of arrival of the leading edge of the recording material P at the nip portion N after the timing of arrival of the leading edge at the pre-fixing conveyance path sensor 94 after the preliminary rotation operation, the air flow path temperature is 40° C. in the case of the operation of continuously opening the spraying solenoid valve 96*e* and is 53° C. in the case of the operation of repeatedly opening and closing the spraying solenoid valve 96*e*.

Figure 19:
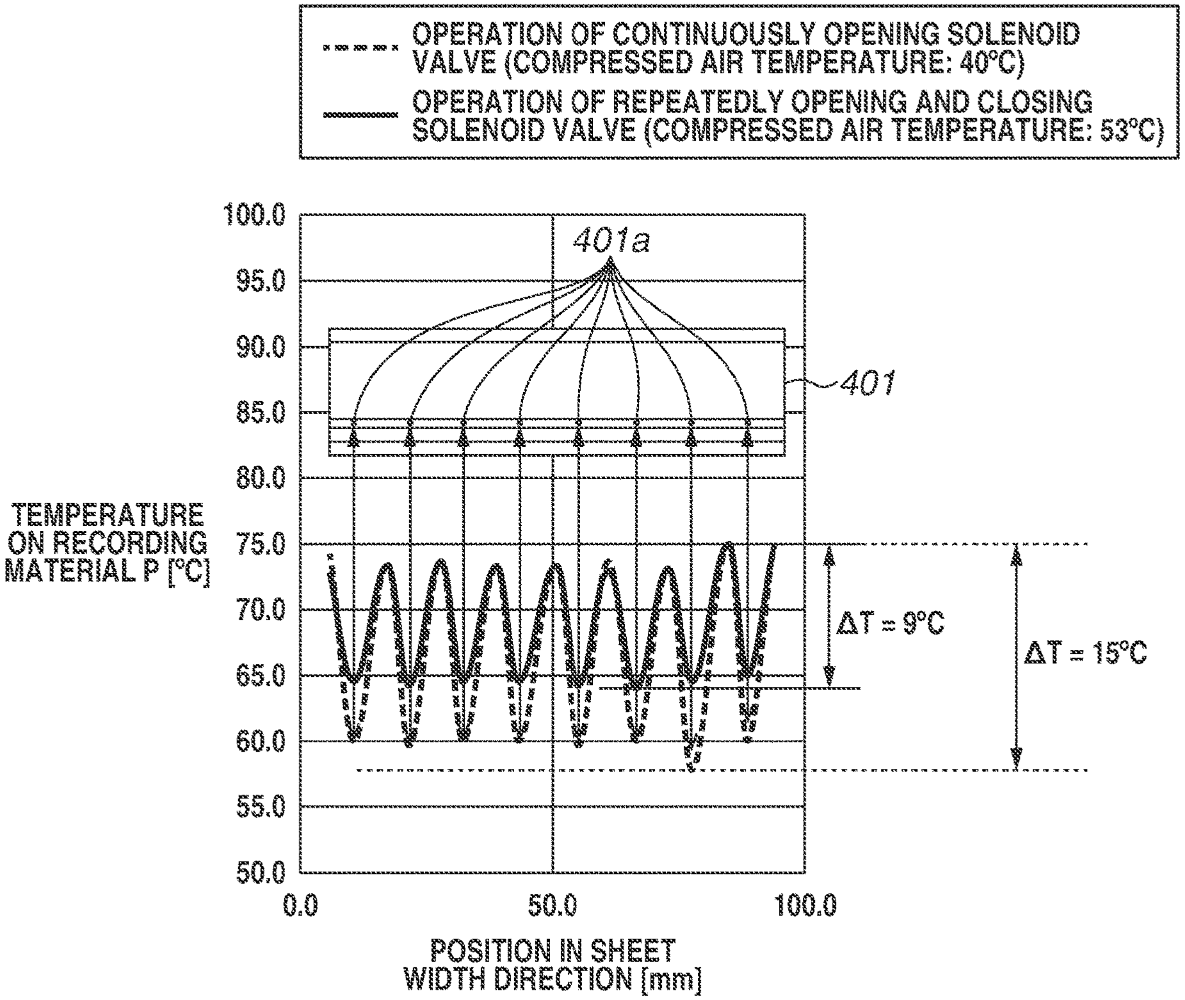
FIG. 19 is a diagram illustrating temperature distribution on the recording material P according to the third exemplary embodiment and according to the conventional example.
Figure 20:
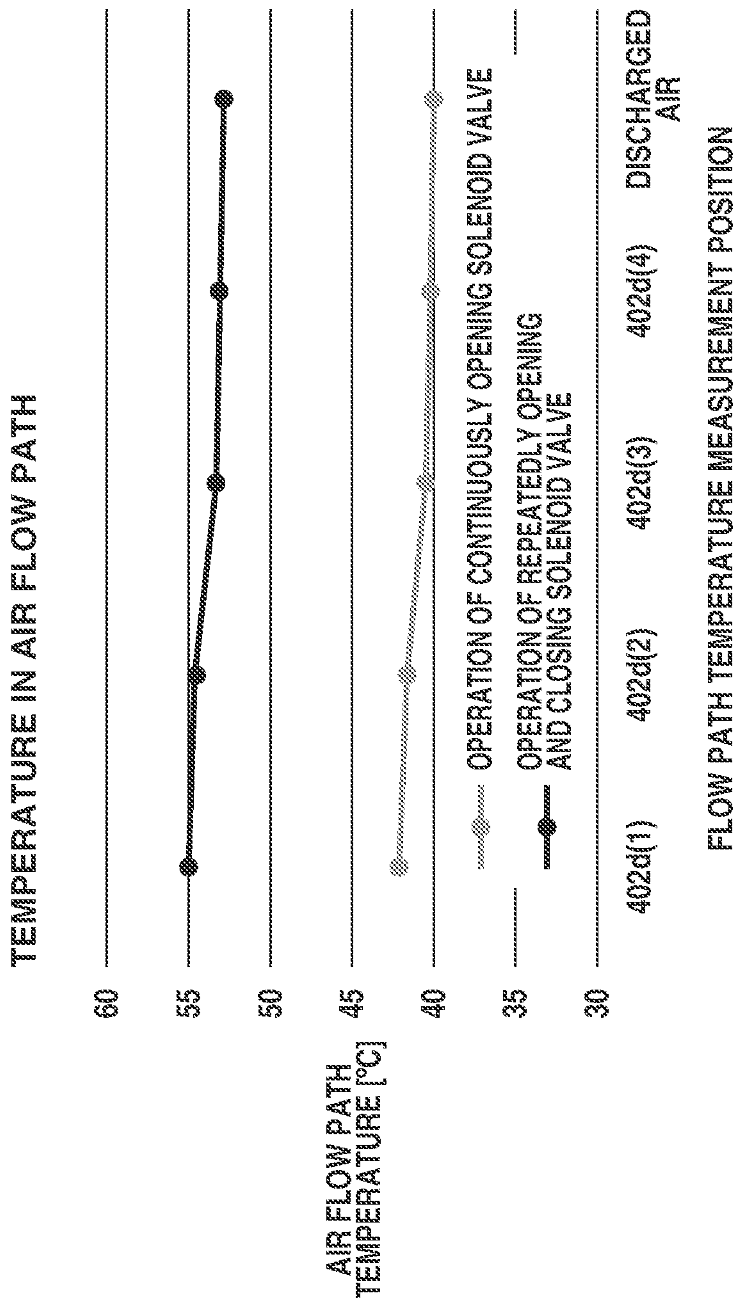
FIG. 20 is a diagram illustrating air flow path temperatures at different positions according to the third exemplary embodiment and according to the conventional example.

FIG. 19 illustrates temperature distribution on the recording material P immediately after the spraying of the compressed air on the recording material P. FIG. 20 illustrates a relationship between an air flow path position and an air temperature. FIG. 20 illustrates results of measuring flow path temperatures using the thermocouples installed from the tube joints 402$d$(1) to 402$d$(4) into the air tubes 402$c$ so as not to be in contact with the inner surfaces of the air tubes 402$c$. As illustrated in FIG. 20, since the air flow path is lower in temperature than the heated compressed air in the operation of continuously opening the spraying solenoid valve 96$e$, the temperature of the compressed air decreases to 40° C. by the time the compressed air is discharged to the toner on the recording material P, and the difference ΔT between the highest temperature portion and the lowest temperature portion on the toner surface is a maximum of 15° C. (refer to FIG. 19).

On the contrary, in the case of performing the operation of repeatedly opening and closing the spraying solenoid valve 96$e$ according to the present exemplary embodiment, as illustrated in FIG. 20, the temperature of the air flow path through which the compressed air heated while passing through the air heating member 402$b$ reaches the air nozzle 401 is high and is about 53° C. Thus, the compressed air maintained at a high temperature of about 53° C. is discharged from the air nozzle 401. The difference ΔT between the highest temperature portion and the lowest temperature portion on the toner surface at the time of discharging the compressed air to the toner on the recording material P is a maximum of 9° C. (refer to FIG. 19).

FIG. 11 illustrates the relationship between the difference ΔT and the gloss unevenness visibility rank. By performing the operation of repeatedly opening and closing the spraying solenoid valve 96$e$, the difference ΔT is reduced to 9° C., and the visibility rank is improved to be at the visually unidentifiable level.

Figure 22A:
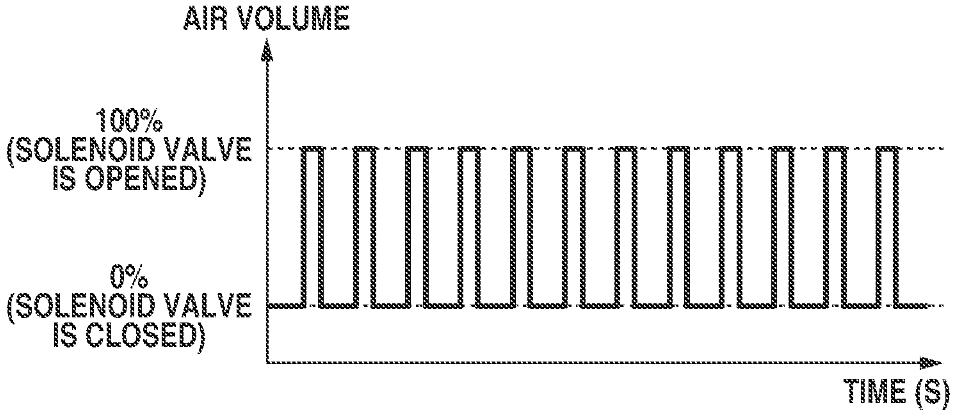
FIGS. 22A and 22B are diagrams respectively illustrating spraying operation control according to a conventional example and an operation of repeatedly opening and closing a solenoid valve according to the third exemplary embodiment.
Figure 22B:
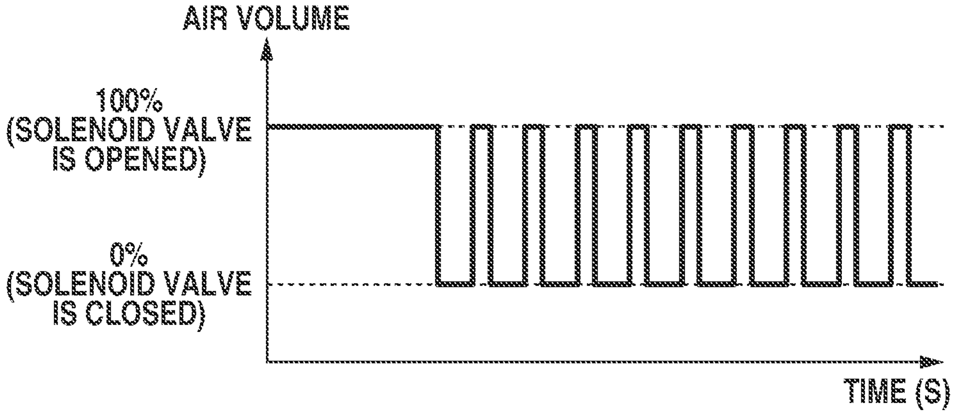

As described above, the conventional spraying operation control (in FIG. 22A) is changed to the operation of repeatedly opening and closing the spraying solenoid valve 96$e$ (in FIG. 22B) as illustrated in FIGS. 22A and 22B. Consequently, the operation of opening the spraying solenoid valve 96$e$ is performed from the time of starting the preliminary rotation operation upon receiving a sheet feed instruction, and the compressed air in a volume greater than that in the spraying operation control is flowed into the air nozzle 401 for the separation of the recording material P. This produces an effect of increasing the air flow path temperature, and prevents a decrease in temperature from the heating flow path to the air nozzle 401 by changing to the operation of repeatedly opening and closing the spraying solenoid valve 96$e$ after a lapse of a predetermined time (which is 27 seconds in the present exemplary embodiment). As a result, high-quality images are obtained.

The air volume in the continuous opening operation may not necessarily be set to 100%. The air volume can be reduced by changing the opening amount of the spraying solenoid valve 96$e$ or by reducing the pressure of the compressor 96$a$.

<Compressed Air Pressure Recovery Control>

In a fourth exemplary embodiment, the configuration of the fixing device F is the same as the configuration according to the first exemplary embodiment, but control for recovering, before the fixing operation, the pressure of the compressed air decreased by the air flow path heating control will be described.

Figure 23A:
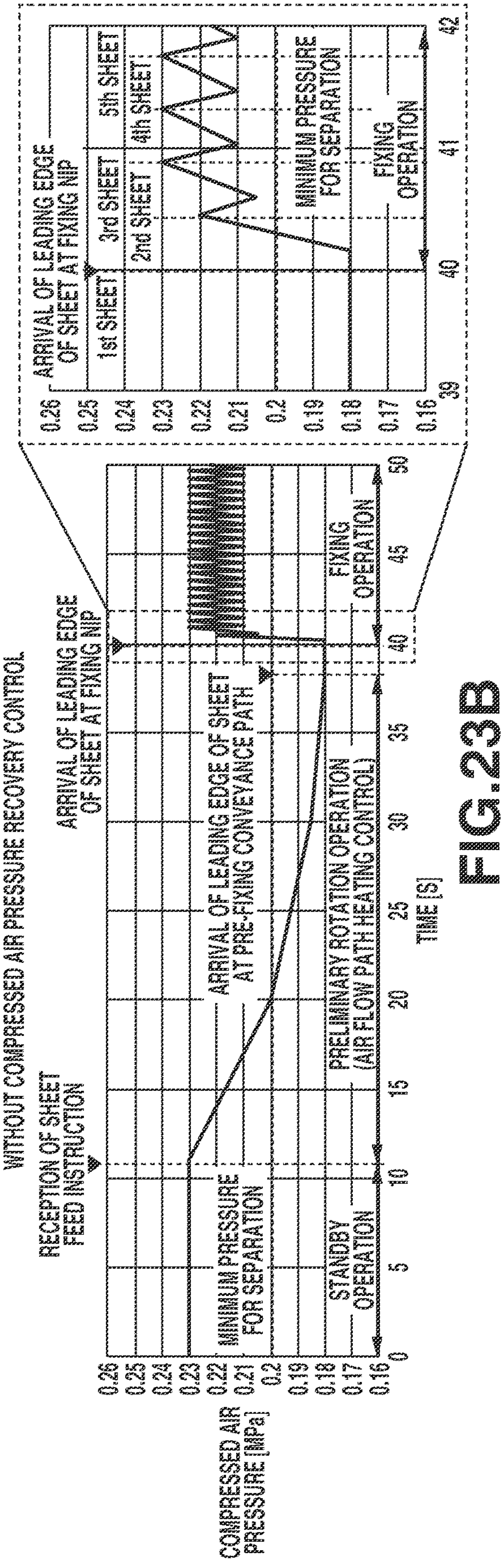
FIGS. 23A and 23B are diagrams illustrating compressed air pressure recovery control according to a fourth exemplary embodiment.
Figure 23B:
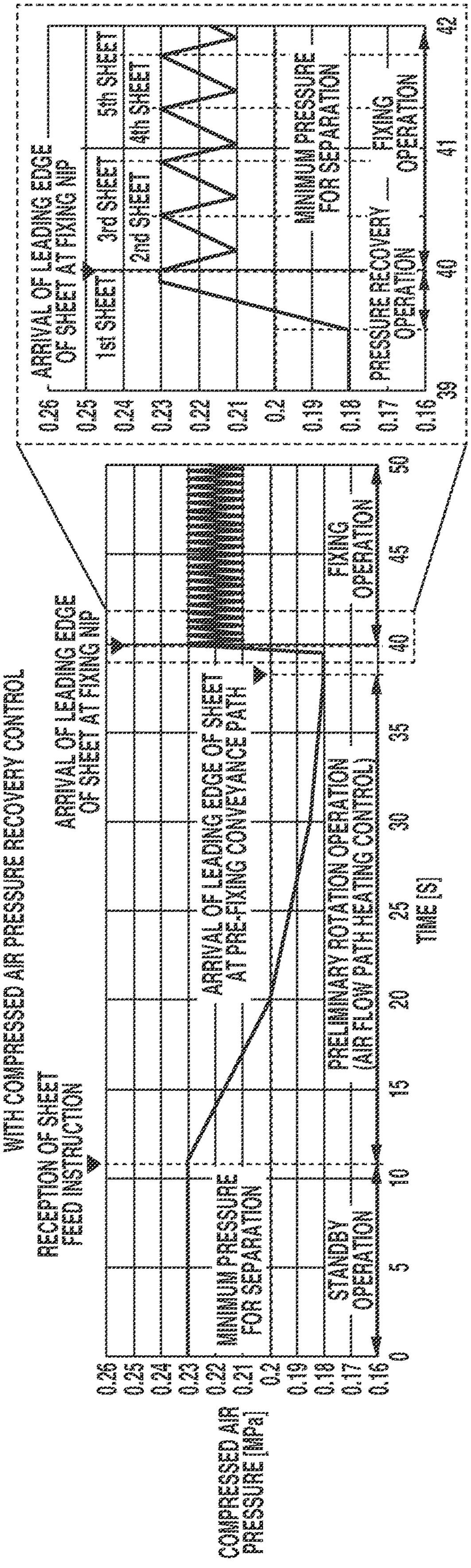

The control will be described with reference to FIGS. 23A and 23B. FIG. 23A illustrates a change in the pressure of the compressed air in the piping tube 96$g$ in a period from the standby operation to the fixing operation in a case with the compressed air pressure recovery control, whereas FIG. 23B illustrates a change in the pressure of the compressed air in the piping tube 96$g$ in the period from the standby operation to the fixing operation in a case without the compressed air pressure recovery control. The pressure regulating valve 96$c$ regulates the pressure in the piping tube 96$g$ to 0.2 MPa to 0.3 MPa in a state where the spraying solenoid valve 96$e$ is closed. In the present exemplary embodiment, a case will be described where the pressure regulating valve 96$c$ regulates the pressure of the compressed air in the piping tube 96$g$ to 0.23 MPa.

In the fixing device F according to the present exemplary embodiment, in a case where the recording material P is separated from the belt 301 by spraying the compressed air on the recording material P, especially under a thin-sheet condition which makes it difficult to separate the recording material P, the compressed air with a pressure of 0.20 MPa or higher in the piping tube 96$g$ is to be sprayed. In a case where the air flow path heating control according to any of the first to third exemplary embodiments is performed, since the spraying solenoid valve 96$e$ is opened and the compressed air is released from the air nozzle 401 into the atmosphere, the pressure in the piping tube 96$g$ decreases compared to the state where the spraying solenoid valve 96$e$ is closed. In this case, the pressure in the piping tube 96$g$ sometimes drops below 0.20 MPa after a lapse of a certain period of time from the start of the air flow path heating control, depending on the regulating state of the pressure regulating valve 96$c$. Thus, if the fixing operation is started immediately after the completion of the air flow path heating control and the spraying operation is performed as illustrated in FIG. 23A, the recording material P may fail to be separated from the belt 301. More specifically, this is because the compressed air with a pressure lower than 0.20 MPa, which is the minimum pressure for separating the recording material P, is sprayed on the first sheet of the recording material P having reached the nip portion N.

Next, the compressed air pressure recovery control according to the present exemplary embodiment will be described. The compressed air pressure recovery control is performed immediately before the fixing operation after the air flow path heating control, as illustrated in FIG. 23B.

The compressed air pressure recovery control is an operation of closing the spraying solenoid valve 96$e$ until the pressure in the piping tube 96$g$ exceeds the minimum pressure for separating the recording material P. In the present exemplary embodiment, the spraying solenoid valve 96$e$ is closed for 0.5 seconds before the start of the fixing operation to ensure that the pressure of the compressed air in the piping tube 96$g$ is recovered. This makes it possible to spray the compressed air with a pressure higher than or equal to 0.20 MPa in the piping tube 96$g$, on the first sheet of the recording material P having reached the nip portion N after the air flow path heating control, so that the recording material P is successfully separated from the belt 301. The spraying member D according to the present exemplary embodiment is set so that the spraying solenoid valve 96$e$ is closed for 0.5 seconds before the entry of the leading edge of the first sheet of the recording material P into the nip portion N during a job to ensure that the pressure of the compressed air in the piping tube 96$g$ is recovered. On the contrary, the time of stopping the spraying operation in a period after the spraying member D sprays the compressed air on a sheet of the recording material P and before the spraying member D sprays the compressed air on the next sheet of the recording material P during the fixing operation of fixing the toner image to the recording material P is 0.2 seconds. As illustrated in FIGS. 23A and 23B, the pressure at the time of arrival of the leading edge of the first sheet of the recording material P at the pre-fixing conveyance path is lower than the pressures for the second and subsequent sheets. Thus, the amount for recovering the pressure at the time of arrival of the leading edge of the first sheet of the recording material P at the pre-fixing conveyance path to a pressure higher than or equal to the minimum pressure for separating the recording material P is greater than the amount for recovering the pressures for the second and subsequent sheets to a pressure higher than or equal to the minimum pressure for separating the recording material P. Thus, the time to increase the pressure is to be set separately for the first sheet. In the present exemplary embodiment, the spraying member D stops the spraying operation for 0.5 seconds before performing the spraying operation on the first sheet.

The pressure recovery operation is not limited to the operation of closing the spraying solenoid valve 96*e*. The pressure in the piping tube 96*g* can be increased by changing the opening amount of the spraying solenoid valve 96*e*. Further, the pressure recovery operation may not necessarily recover the pressure of the compressed air in the piping tube 96*g* to the pressure regulated by the pressure regulating valve 96*c*, and it is sufficient to recover the pressure to the minimum pressure for separating the recording material P.

Embodiments of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described Embodiments and/or that includes one or more circuits (e.g., application specific integrated circuit (ASIC)) for performing the functions of one or more of the above-described Embodiments, and by a method performed by the computer of the system or apparatus by, for example, reading out and executing the computer executable instructions from the storage medium to perform the functions of one or more of the above-described Embodiments and/or controlling the one or more circuits to perform the functions of one or more of the above-described Embodiments. The computer may include one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read-only memory (ROM), a storage of distributed computing systems, an optical disk (such as a compact disc (CD), digital versatile disc (DVD), or Blu-ray Disc™ (BD)), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-166038, filed Oct. 17, 2022, which is hereby incorporated by reference herein in its entirety.

What is claimed is:

1. An image forming apparatus comprising:
- a reception unit configured to receive a job for image formation on a recording material;
- a heating rotary member configured to rotate and to heat the recording material;
- a pressing rotary member configured to come into contact with the heating rotary member to form a nip portion, wherein, at the nip portion, the pressing rotary member together with the heating rotary member fixes a toner image to the recording material; and
- a spraying member configured to spray air on the recording material and the heating rotary member and including a nozzle and a cylinder configured to send air to the nozzle,
- wherein the nozzle is configured to discharge air to the heating rotary member and the recording material, and is located downstream of the nip portion in a conveyance direction of the recording material,
- wherein, during a period after the reception unit receives the job and before a leading edge of a first sheet of the recording material reaches the nip portion, the spraying member performs a spraying operation of spraying the air in an amount greater than or equal to a predetermined amount, and
- wherein the air that the spraying member sprays on the first sheet of the recording material during the job is higher in temperature than the air that the spraying member sprays during the period after the reception unit receives the job and before the leading edge of the first sheet of the recording material reaches the nip portion.

2. The image forming apparatus according to claim 1, wherein the cylinder includes a first portion extending in a width direction of the heating rotary member.

3. The image forming apparatus according to claim 2,
- wherein the cylinder includes a second portion disposed downstream of the first portion in a flow path direction in which the air flows from the first portion to the nozzle, and
- wherein the second portion is located outside the heating rotary member in the width direction.

4. The image forming apparatus according to claim 3, wherein the predetermined amount is an amount of the air that the spraying member sprays during the period after the reception unit receives the job and before the leading edge of the first sheet of the recording material reaches the nip portion, and is greater than or equal to an amount of air stored in the second portion.

5. The image forming apparatus according to claim 2, wherein the first portion is disposed above the heating rotary member.

6. The image forming apparatus according to claim 1, wherein the spraying member repeatedly performs the spraying operation of spraying the air during the period after the reception unit receives the job and before the leading edge of the first sheet of the recording material reaches the nip portion.

7. The image forming apparatus according to claim 1, wherein the spraying member includes a compressor.

8. The image forming apparatus according to claim 7, wherein the compressor is disposed on a rear side of the image forming apparatus, and a second portion of the cylinder disposed downstream of a first portion in a flow path direction is disposed on a front side of the image forming apparatus.

9. The image forming apparatus according to claim 1, wherein the nozzle includes a plurality of holes.

10. The image forming apparatus according to claim 1, wherein, during the period after the reception unit receives the job and before the leading edge of the first sheet of the recording material reaches the nip portion, the spraying member stops the spraying operation for a predetermined time after spraying the air in the amount greater than or equal to the predetermined amount.

11. The image forming apparatus according to claim 10, further comprising a detection unit that is located upstream of the nip portion in the conveyance direction of the recording material and is configured to detect the recording material, wherein the spraying member stops the spraying operation in a case where the detection unit detects the first sheet of the recording material after the spraying member sprays the air in the amount greater than or equal to the predetermined amount.

12. The image forming apparatus according to claim 10, wherein the predetermined time is longer than a time of the spraying operation stopped in an interval between the first sheet of the recording material and a second sheet of the recording material during the job.

* * * * *